US010553193B2

(12) United States Patent
Lu (10) Patent No.: US 10,553,193 B2
(45) Date of Patent: *Feb. 4, 2020

(54) POLYMER INTERLAYERS HAVING IMPROVED SOUND INSULATION PROPERTIES

(71) Applicant: Solutia Inc., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,949

(22) Filed: Jun. 28, 2019

(65) Prior Publication Data

US 2019/0318717 A1 Oct. 17, 2019

Related U.S. Application Data

(63) Continuation of application No. 15/799,451, filed on Oct. 31, 2017, now Pat. No. 10,354,636, which is a continuation-in-part of application No. 14/563,719, filed on Dec. 8, 2014, now Pat. No. 9,809,006.

(51) Int. Cl.

| | | |
|---|---|---|
| *B32B 27/08* | (2006.01) | |
| *B32B 27/22* | (2006.01) | |
| *B32B 27/36* | (2006.01) | |
| *G10K 11/168* | (2006.01) | |
| *B32B 17/10* | (2006.01) | |
| *B32B 7/02* | (2019.01) | |
| *B32B 27/30* | (2006.01) | |

(52) U.S. Cl.
CPC .............. *G10K 11/168* (2013.01); *B32B 7/02* (2013.01); *B32B 17/10605* (2013.01); *B32B 17/10761* (2013.01); *B32B 27/08* (2013.01); *B32B 27/22* (2013.01); *B32B 27/306* (2013.01); *B32B 27/36* (2013.01); *B32B 2250/03* (2013.01); *B32B 2250/04* (2013.01); *B32B 2250/40* (2013.01); *B32B 2270/00* (2013.01); *B32B 2307/102* (2013.01); *B32B 2307/412* (2013.01); *B32B 2307/418* (2013.01); *B32B 2307/558* (2013.01); *B32B 2307/732* (2013.01); *B32B 2331/04* (2013.01); *B32B 2419/00* (2013.01); *B32B 2457/12* (2013.01); *B32B 2551/00* (2013.01); *B32B 2571/02* (2013.01); *B32B 2605/00* (2013.01); *B32B 2605/006* (2013.01); *B32B 2607/02* (2013.01)

(58) Field of Classification Search
None
See application file for complete search history.

(56) References Cited

U.S. PATENT DOCUMENTS

| | | |
|---|---|---|
| 2,282,026 A | 5/1942 | Bren et al. |
| 2,282,057 A | 5/1942 | Hopkins et al. |
| 2,456,366 A | 12/1948 | Bren et al. |
| 3,644,594 A | 2/1972 | Mont |
| 4,165,397 A | 8/1979 | Ogden |
| 4,361,625 A | 11/1982 | Beckmann et al. |
| 4,874,814 A | 10/1989 | Cartier |
| 4,968,744 A | 11/1990 | Misra et al. |
| 5,169,897 A | 12/1992 | Walls |
| 5,190,826 A | 3/1993 | Asahina et al. |
| 5,290,660 A | 3/1994 | Eian et al. |
| 5,336,565 A | 8/1994 | Muromachi et al. |
| 5,340,654 A | 8/1994 | Ueda et al. |
| 5,409,734 A | 4/1995 | Lee et al. |
| 5,593,786 A | 1/1997 | Parker et al. |
| 5,728,472 A | 3/1998 | D'Errico |
| 5,812,332 A | 9/1998 | Freeman |
| 5,830,568 A | 11/1998 | Kondo |
| 6,534,152 B2 | 3/2003 | Freeman |
| 6,733,872 B2 | 5/2004 | Nagai |
| 6,984,679 B2 | 1/2006 | Papenfuhs et al. |
| 7,121,380 B2 | 10/2006 | Garnier et al. |
| 7,452,608 B2 | 11/2008 | Fukatani et al. |
| 7,510,771 B2 | 3/2009 | Lu |
| 7,854,993 B2 | 12/2010 | Lu |
| 7,883,761 B2 | 2/2011 | Bourcier et al. |
| 8,470,908 B2 | 6/2013 | Frank |
| 8,597,792 B2 | 12/2013 | Meise et al. |
| 8,715,815 B2 | 5/2014 | Shimamoto |
| 8,741,439 B2 | 6/2014 | Shimamoto et al. |
| 8,920,930 B2 | 12/2014 | Meise et al. |
| 9,114,595 B2 | 8/2015 | Bourcier et al. |
| 9,238,354 B2 | 1/2016 | Iwamoto |
| 9,789,668 B2 | 10/2017 | Matsuda et al. |
| 9,809,006 B2 * | 11/2017 | Lu ..................... B32B 17/10605 |
| 10,354,636 B2 * | 7/2019 | Lu ..................... B32B 17/10605 |
| 2003/0139520 A1 | 7/2003 | Toyoma |
| 2004/0065229 A1 | 4/2004 | Papenfuhs et al. |
| 2004/0219365 A1 | 11/2004 | Yuan |

(Continued)

FOREIGN PATENT DOCUMENTS

| | | |
|---|---|---|
| DE | 10343385 A1 | 4/2005 |
| DE | 102008001512 A1 | 11/2009 |

(Continued)

OTHER PUBLICATIONS

ChemicalBook, Triethylene glycol bis(2-ethylhexanoate), Access Jul. 13, 2015 by Examiner, First Page.

(Continued)

*Primary Examiner* — Sheeba Ahmed
(74) *Attorney, Agent, or Firm* — Michelle Bugbee (57) ABSTRACT

A polymer interlayer comprising a layer comprising a poly (vinyl acetal) resin having a residual hydroxyl content and a residual acetate content, and a plasticizer, wherein the residual hydroxyl content, the residual acetate content and the plasticizer are selected such that the polymer interlayer has at least one glass transition temperature less than about 20° C. and a peak tan delta of greater than 1.29, and a glass panel having a configuration of 2.3-mm glass//interlayer// 2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency is disclosed.

20 Claims, 2 Drawing Sheets

(56) References Cited

U.S. PATENT DOCUMENTS

| | | |
|---|---|---|
| 2005/0142332 A1 | 6/2005 | Sauer |
| 2006/0008648 A1 | 1/2006 | Bennison |
| 2006/0008658 A1 | 1/2006 | Fukatani et al. |
| 2006/0210776 A1 | 9/2006 | Lu et al. |
| 2007/0036956 A1 | 2/2007 | Chen et al. |
| 2007/0122629 A1 | 5/2007 | Chen et al. |
| 2007/0148472 A1 | 6/2007 | Masaki et al. |
| 2007/0248809 A1 | 10/2007 | Haldeman et al. |
| 2007/0289693 A1 | 12/2007 | Anderson et al. |
| 2008/0268270 A1 | 10/2008 | Chen et al. |
| 2008/0280076 A1 | 11/2008 | Hayes et al. |
| 2008/0286542 A1 | 11/2008 | Hayes et al. |
| 2008/0306190 A1 | 12/2008 | Weiss |
| 2009/0011230 A1 | 1/2009 | Rymer et al. |
| 2009/0218034 A1 | 9/2009 | Kawabe |
| 2009/0226750 A1 | 9/2009 | Lu |
| 2009/0233090 A1 | 9/2009 | Wong |
| 2009/0293952 A1 | 12/2009 | Koran et al. |
| 2009/0303604 A1 | 12/2009 | Martin |
| 2010/0028642 A1* | 2/2010 | Steuer ............... B32B 17/10761 428/220 |
| 2010/0040868 A1 | 2/2010 | Fukatani et al. |
| 2010/0124647 A1 | 5/2010 | Keller et al. |
| 2010/0233493 A1 | 9/2010 | Marumoto |
| 2010/0314900 A1 | 12/2010 | Labrot et al. |
| 2011/0049434 A1 | 3/2011 | Ootsuki |
| 2011/0076459 A1 | 3/2011 | Lu |
| 2011/0096555 A1 | 4/2011 | Pires et al. |
| 2012/0133764 A1 | 5/2012 | Hurlbut |
| 2012/0263958 A1 | 10/2012 | Iwamoto et al. |
| 2012/0288722 A1 | 11/2012 | Iwamoto |
| 2013/0022824 A1 | 1/2013 | Meise et al. |
| 2013/0022825 A1 | 1/2013 | Meise et al. |
| 2013/0074931 A1 | 3/2013 | Chen |
| 2013/0157065 A1 | 6/2013 | Shimamoto et al. |
| 2013/0183532 A1 | 7/2013 | Shimamoto et al. |
| 2013/0189527 A1 | 7/2013 | Meise et al. |
| 2013/0236693 A1 | 9/2013 | Lu |
| 2013/0236711 A1 | 9/2013 | Lu |
| 2013/0273378 A1 | 10/2013 | Iwamoto et al. |
| 2013/0274396 A1 | 10/2013 | Arendt et al. |
| 2013/0323516 A1 | 12/2013 | Shimamoto et al. |
| 2014/0000977 A1 | 1/2014 | Matsuda et al. |
| 2014/0349124 A1 | 11/2014 | Shimamoto et al. |
| 2015/0158276 A1 | 6/2015 | Thompson et al. |
| 2015/0258747 A1 | 9/2015 | Miyai |
| 2015/0306853 A1 | 10/2015 | Beekhuizen |
| 2016/0046783 A1 | 2/2016 | Asanuma |
| 2016/0046784 A1 | 2/2016 | Asanuma |
| 2017/0225435 A1 | 8/2017 | Hirano et al. |

FOREIGN PATENT DOCUMENTS

| | | |
|---|---|---|
| EP | 2623474 A1 | 8/2013 |
| JP | 05-104687 A | 4/1993 |
| JP | H05-138840 A | 6/1993 |
| JP | 05-310449 A | 11/1993 |
| JP | H6-273327 A | 9/1994 |
| JP | 09-156967 A | 6/1997 |
| JP | 2001-206742 A | 7/2001 |
| JP | 2013/010671 A | 1/2013 |
| JP | 2013/122643 A | 6/2013 |
| KR | 20130049046 A | 11/2013 |
| MX | 2017 003991 A | 7/2017 |
| WO | WO 2006/102049 A3 | 12/2006 |
| WO | WO 2010/108975 A1 | 9/2010 |
| WO | WO 2012/092366 | 7/2012 |
| WO | WO 2014/022663 A1 | 2/2014 |
| WO | WO 2014/158786 A1 | 10/2014 |

OTHER PUBLICATIONS

Ellis, Bryan and Ray Smith. "Polymers—A Property Database ($2^{nd}$ Edition)", Dec. 2009, Taylor & Francis, $2^{nd}$ Edition, p. 573.

http://www.chemicalbook.com/ChemicalProductProperty_EN_CB0225180.htm; Jul. 2011.

Sigma-Aldrich®. "Poly(3-methyl-1,5-pentanediol Adipate)," Retrieved Apr. 11, 2016, p. 1.

Dupont, Untitled [discloses comparisons between PVB and SGP interlayers used in safety glass], accessed on Sep. 12, 2016, Dupont. com, obtained from http://www2.dupont.com/Building_Innovations/zh_CN/assets/downloads/SGPintro_E.pdf.

PubChem, Glutaraldehyde, accessed on Sep. 12, 2016, NIH.gov, obtained from https://pubchem.ncbi.nlm.nih.gov/compound/glotaraldehyde#section=Top.

Sigma-Aldrich, Tri(ethylene glycol) bis(2-ethylhexanoate), accessed on Sep. 12, 2016, Sigmaaldrich.com, obtained from http://www.sigmaaldrich.com/catalog/product/aldrich/525103?lang-en®ion=US.

AzoM, Indium Tin Oxide (ITO)—Properties and Applications, Jan. 23, 2004, Azo Materials, obtained from http://www.azom.com/article.aspx?ArticleID=2349.

Sigma-Aldrich "Di(propylene glycol) dibenzoate" retrieved Jul. 1, 2016, 3 pages.

Wade, B.E., Vinyl Acetal Polymers, in Encyclopedia of Polymer Science & Technology, 3rd edition, vol. 8, pp. 381-399, (2003).

"Aerosil MOX 170 MSDS"; Evonik Industries, Jun. 25, 2016; pp. 1-12.

Hallensleben, Manfred L. et al.; "Polyvinyl Compounds, Others"; Ullmann's Encyclopedia of Industrial Chemistry; Jul. 2015; pp. 1-23.

Naje, Asama Natik, et al.; "Effect of Indium Tin Oxide (ITO) Nanoparticles on the Optical Properties of PMMA Polymer"; Journal of University of Kerbala, The International $3^{rd}$ Scientific Conference of the College of Science; 2015; pp. 17-23.

"Chemical Information Profile for Indium Tin Oxide"; National Toxicology Program; Jun. 2009; pp. 1-28.

Althues, H. et al.; "Functional inorganic nanofillers for transparent polymers"; Chemical Society Reviews; Mar. 2007; pp. 1454-1465.

Wypych, George; "Sources of Fillers, Their Chemical Composition, Properties, and Morphology"; Handbook of Fillers, $2^{nd}$ Edition; 2000; pp. 19-177.

Reis, Joao Carlos R. et al.; "Refractive Index of Liquid Mixtures: Theory and Experiment"; ChemPhysChem; 2010; pp. 3722-3733.

"UNIPLEX 988 and UNIPLEX 988S" Technical Information: Lanxess Deutschland GmbH; 2012; pp. 2.

"BUTVAR polyvinyl butyral resin—Properties and uses" Technical Information; 2013; pp. 1-29.

parchem.com, cinnamaldehyde, 2017, obtain from www.parchem.com/cinnamaldehyde-getpdf-011158.aspx.

parchem.com, Dipropylene Glycol Dibenzoate, 2017, obtained from http://www.parchem.com/chemical-supplier-distributor/Dipropylene-Glycol-Dibenzoate-012292.aspx.

Mackey, Randy; "The Physics of Windshield Repair"; Glass Magazine; 2 pages; Jan. 1, 2007.

Co-pending U.S. Appl. No. 14/299,945, filed Jun. 9, 2014, Jun Lu, et al.; now U.S. Publication No. 2014-0363651.

Co-pending U.S. Appl. No. 14/300,612, filed Jun. 10, 2014, Jun Lu; now U.S. Pat. No. 9,248,626.

Co-pending U.S. Appl. No. 14/973,547, filed Dec. 17, 2015, Jun Lu.; now U.S. Pat. No. 9,636,894.

Co-pending U.S. Appl. No. 15/474,105, filed Mar. 30, 2017, Jun Lu; now U.S. Pat. No. 10,065,399.

Co-pending U.S. Appl. No. 14/299,996, filed Jun. 9, 2014, Jun Lu, et al.; now U.S. Pat. No. 9,254,625.

Co-pending U.S. Appl. No. 14/973,500, filed Dec. 17, 2015, Lu et al.; now U.S. Pat. No. 9,592,653.

Co-pending U.S. Appl. No. 15/438,243, filed Feb. 21, 2017, Lu et al.; now U.S. Pat. No. 9,914,286.

Co-pending U.S. Appl. No. 15/914,322, filed Mar. 7, 2018, Jun Lu and Wenjie Chen; now U.S. Publication No. 2018-0194120.

Co-pending U.S. Appl. No. 14/563,347, filed Dec. 8, 2014; Jun Lu and Yalda Farhoudi; now U.S. Pat. No. 9,586,386.

Co-pending U.S. Appl. No. 15/428,557, filed Feb. 9, 2017, Jun Lu and Yalda Farhoudi; now U.S. Pat. No. 10,076,893.

Co-pending U.S. Appl. No. 14/563,352, filed Dec. 8, 2014, Zhou Li, et al.; now U.S. Pat. No. 9,884,957.

(56) References Cited

OTHER PUBLICATIONS

Co-pending U.S. Appl. No. 15/863,321, filed Jan. 5, 2018; Zhou Li; now U.S. Pat. No. 9,988,525.
Co-pending U.S. Appl. No. 15/987,335, filed May 24, 2018; Zhou Li; now U.S. Publication No. 2018-0265688.
Co-pending U.S. Appl. No. 14/563,359, filed Dec. 8, 2014, Jun Lu, et al.; now U.S. Pat. No. 9,925,746.
Co-pending U.S. Appl. No. 14/563,364, filed Dec. 8, 2014, Jun Lu, et al.; now U.S. Pat. No. 9,522,517.
Co-pending U.S. Appl. No. 15/376,849, filed Dec. 13, 2016; Lu and Li; now U.S. Publication No. 2017-0087813.
Co-pending U.S. Appl. No. 14/563,372, filed Dec. 8, 2014, Jun Lu, et al.; now U.S. Pat. No. 9,586,387.
Co-pending U.S. Appl. No. 15/427,798, filed Feb. 8, 2017; Jun Lu et al.; now U.S. Pat. No. 10,065,397.
Co-pending U.S. Appl. No. 14/563,373, filed Dec. 8, 2014, Jun Lu, et al.; now U.S. Pat. No. 9,573,329.
Co-pending U.S. Appl. No. 15/246,810, filed Aug. 25, 2016; Jun Lu et al.; now U.S. Publication No. 2016-0361899.
Co-pending U.S. Appl. No. 15/427,844, filed Feb. 8, 2017; Lu and Li; now U.S. Publication No. 2017-0144414.
Co-pending U.S. Appl. No. 14/514,641, filed Oct. 15, 2014, Jun Lu; now U.S. Pat. No. 9,355,631
Co-pending U.S. Appl. No. 14/882,317, filed Oct. 13, 2015, Jun Lu, et al.; now U.S. Pat. No. 9,809,010.
Co-pending U.S. Appl. No. 15/051,222, filed Feb. 23, 2016, Jun Lu; now U.S. Pat. No. 9,460,702.
Co-pending U.S. Appl. No. 15/248,502, filed Aug. 26, 2016; Jun Lu; now U.S. Pat. No. 9,576,568.
Co-pending U.S. Appl. No. 15/729,959, filed Oct. 11, 2017; Lu and Chen; now U.S. Publication No. 2018-0029341.
Co-pending U.S. Appl. No. 14/505,191, filed Oct. 2, 2014, Jun Lu; now U.S. Publication No. 2016-0096349.
Co-pending U.S. Appl. No. 14/563,378, filed Dec. 8, 2014, Jun Lu, et al.; now U.S. Pat. No. 9,815,976.
Co-pending U.S. Appl. No. 14/563,622 filed Dec. 8, 2014, Jun Lu, et al.; now U.S. Pat. No. 9,809,009.
Co-pending U.S. Appl. No. 15/729,937, filed Oct. 11, 2017; Lu, et al.; now U.S. Publication No. 2018-0029340.
Co-pending U.S. Appl. No. 14/563,011, filed Dec. 8, 2014, Jun Lu; now U.S. Pat. No. 9,975,315.
Co-pending U.S. Appl. No. 14/563,381, filed Dec. 8, 2014, Jun Lu, et al.; now U.S. Pat. No. 9,809,695.
Co-pending U.S. Appl. No. 15/051,183, filed Feb. 23, 2016, Spangler et al.; now U.S. Publication No. 2016-0168353.
Co-pending U.S. Appl. No. 15/886,122, filed Feb. 1, 2018, Jun Lu; now U.S. Publication No. 2018-0154618.
Co-pending U.S. Appl. No. 16/164,880, filed Oct. 19, 2018, Lu and Li; now U.S. Publication No. 2019-0047271.
Co-pending U.S. Appl. No. 15/834,580, filed Dec. 7, 2017, Jun Lu; now U.S. Publication No. 2018-0354245.
Co-pending U.S. Appl. No. 15/929,116, filed Mar. 25, 2019, Jun Lu.
Co-pending U.S. Appl. No. 15/805,360, filed Nov. 7, 2017, Jun Lu, et al.; now U.S. Publication No. 2018-0086908.
Notification of Transmittal of the International Search Report and the Written Opinion of the International Searching Authority, or the Declaration dated Jan. 22, 2015 received in International Application No. PCT/US2014/041689.
Notification of Transmittal of the International Search Report and the Written Opinion of the International Searching Authority, or the Declaration dated Aug. 29, 2014 received in. International Application No. PCT/US2014/041698.
Notification of Transmittal of the International Search Report and the Written Opinion of the International Searching Authority, or the Declaration dated Jan. 26, 2016 received in International Application No. PCT/US2015/063907.
Notification of Transmittal of the International Search Report and the Written Opinion of the International Searching Authority, or the Declaration dated May 23, 2016 received in International Application No. PCT/US2015/063908.
Notification of Transmittal of the International Search Report and the Written Opinion of the International Searching Authority, or the Declaration dated Jan. 26, 2016 received in International Application No. PCT/US2015/063885.
Notification of Transmittal of the International Search Report and the Written Opinion of the International Searching Authority, or the Declaration dated Jan. 7, 2016 received in International Application No. PCT/US2015/055633.
Notification of Transmittal of the International Search Report and the Written Opinion of the International Searching Authority, or the Declaration dated Nov. 19, 2015 received in International Application No. PCT/US2015/051591.
Notification of Transmittal of the International Search Report and the Written Opinion of the International Searching Authority, or the Declaration dated Nov. 19, 2015 received in International Application No. PCT/US2015/051593.
Notification of Transmittal of the International Search Report and the Written Opinion of the International Searching Authority, or the Declaration dated Apr. 18, 2016 received International Application No. PCT/US2015/063933.
Notification of Transmittal of the International Search Report and the Written Opinion of the International Searching Authority, or the Declaration dated Mar. 29, 2016 received in International Application No. PCT/US2015/063944.
Notification of Transmittal of the International Search Report and the Written Opinion of the International Searching Authority, or the Declaration dated Jan. 26, 2016 received in International Application No. PCT/US2015/063975.
Notification of Transmittal of the International Search Report and the Written Opinion of the International Searching Authority, or the Declaration dated Jul. 1, 2016 received in International Application No. PCT/US2015/063900.
Notification of Transmittal of the International Search Report and the Written Opinion of the International Searching Authority, or the Declaration dated May 9, 2017 received in International Application No. PCT/US2017/016898.

\* cited by examiner

POLYMER INTERLAYERS HAVING IMPROVED SOUND INSULATION PROPERTIES

CROSS REFERENCE TO RELATED APPLICATION(S)

This application is a continuation of U.S. application Ser. No. 15/799,451 filed Oct. 31, 2017, now U.S. Pat. No. 10,354,636 to be issued Jul. 16, 2019; which is a continuation-in-part of U.S. application Ser. No. 14/563,719, filed Dec. 8, 2014, now U.S. Pat. No. 9,809,006, the entire disclosures of which are incorporated by reference herein.

BACKGROUND OF THE INVENTION

Field of the Invention

This disclosure is related to the field of polymer interlayers for multiple layer panels and multiple layer panels having at least one polymer interlayer sheet. Specifically, this disclosure is related to the field of polymer interlayers having improved sound insulation properties, and more specifically, to polymer interlayers having improved sound insulation properties for use in vehicle and building glazings.

Description of Related Art

Occupants of buildings, especially in areas near airports, railways, and human activities, or where street and highway traffic noise is a problem, are increasingly interested in acoustic insulating glazing.

Automobile designers are also aware that a barrier to designing quieter car interiors is the acoustic limitations of automotive glass. As automobile manufacturers have increased their efforts to design and build quieter cars and reduce vehicle interior noise through the treatment of passenger compartment boundaries with sound-attenuating packages, automotive glazing has become the primary transmission path of wind noise, external airborne noise and structure-borne noise, and it is a major contributor to the consumer's perception of vehicle interior noise level.

Laminated glass, made of a poly(vinyl butyral) (PVB) plastic interlayer sandwiched by two panes of glass sheet, has long served for safety purposes and is commonly utilized in architectural window applications and in the windows of motor vehicles and airplanes. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Less known is the advantage of laminated glass for noise attenuation. Over the past decades, architectural use of PVB laminated glass in buildings near airports and railways has served to reduce the noise levels inside the buildings, making it more comfortable for the occupants. Likewise this technology is now being used in buildings where street and highway traffic noise is a problem. Recently, advances in interlayer technology have made improved laminated glass that provides noise, vibration, and harshness improvements for automotive glass.

The sound insulation property of a glass panel can be characterized by Sound Transmission Loss (STL). It is well known that sound transmission through glass exhibits coincident effect. Glass has a specific critical or coincident frequency at which the speed of an incident acoustical wave in air matches that of a glass bending wave. At the coincident frequency, the acoustic wave is especially effective at causing glass to vibrate, and the vibrating glass is an effective sound radiator at or near the coincident frequency and at frequencies above or below the coincident frequency. As a result, glass exhibits a dip or decrease in sound transmission loss, referred to as the coincidence dip or coincident effect, and the glass becomes transparent to sound.

The coincident frequency can be represented by the following equation (1):

$$f_c = c^2/2\pi \times [\rho_s/B]^{1/2} \tag{1}$$

where c is the sound speed in air, $\rho_s$ is the surface density of the glass panel, and B is the bending stiffness of glass panel. In general, the coincident frequency increases with decreasing thickness of the glass panel. For automotive glazings, the coincident frequency is typically in the range of 3150 to 6000 Hz, which is well within the wind noise frequency region of 2000 to 8000 Hz. For laminated architectural building glass (such as windows), the coincident frequency is generally less than about 3150 Hz.

The coincident effect not only results in a dip or decrease in sound transmission loss at the coincident frequency, but also reduces sound transmission loss at frequencies above and below the coincident frequency. Glass panels exhibiting severe coincident effect (low STL) at the coincident frequency will transmit sound more dominantly at that frequency, resulting in an enclosed area (such as the interior of a car or a room in a building) with high sound intensity at or near the coincident frequency. It is therefore important to characterize the sound insulation properties of a glass panel by weight averaging its sound transmission loss in the frequency of interest, such as in the coincident frequency region, and the sound transmission loss at the coincident frequency (as further described herein).

The thermoplastic polymer found in safety glass can consist of a single layer of a thermoplastic polymer, such as poly(vinyl acetal) or poly(vinyl butyral) (PVB), that has had one or more physical characteristics modified in order to increase acoustic dampening and reduce the sound transmission through the glass. Conventional attempts at such acoustic dampening have included using PVB interlayers with low glass transition temperatures. Other attempts have included multilayer interlayers having two adjacent layers of thermoplastic polymer wherein the layers have dissimilar characteristics (see, for example U.S. Pat. Nos. 5,340,654, 5,190,826, and 7,510,771). These multilayer interlayers typically comprise a soft inner or core layer and two stiffer outer or skin layers. The soft core layer provides acoustic damping properties, while the stiff skin layers provide handling, processability, and mechanical strength of the interlayer.

Despite these advances, there is a continued need to further improve the acoustic properties and reduce the sound or noise transmission through the coincident frequency region, especially in the wind noise frequency region. Accordingly, there is a need in the art for the development of an interlayer, either a monolithic or a multilayer interlayer, that provides improved acoustic or sound insulation properties without a reduction in other optical, mechanical, and physical characteristics of an interlayer, and a need for the development of polymer interlayers including monolithic and multilayer interlayers that provide improved acoustic properties for glass panels when used in vehicle and building glazings.

SUMMARY OF THE INVENTION

Because of these and other problems in the art, described herein, among other things is a polymer interlayer comprising: at least a soft layer where the interlayer has improved sound insulation properties. The polymer interlayer comprises a poly(vinyl acetal) resin having a residual hydroxyl content and a residual acetate content, and a plasticizer, wherein the polymer interlayer has excellent acoustic properties and sound insulation properties. The polymer interlayer may be a single (monolithic) layer or a multilayer polymer interlayer.

In an embodiment, a polymer interlayer comprises: a layer comprising a poly(vinyl acetal) resin having a residual hydroxyl content and a residual acetate content, and a plasticizer, wherein the residual hydroxyl content, the residual acetate content and the plasticizer are selected such that the polymer interlayer has a glass transition temperature less than about 20° C. and a peak tan delta of greater than 1.29, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

In embodiments, the plasticizer comprises an aromatic moiety.

In embodiments, the polymer interlayer further comprises a second poly(vinyl acetal) resin. In embodiments, the polymer interlayer further comprises a second layer. In embodiments, the second layer comprises a second poly (vinyl acetal resin) and a second plasticizer.

In an embodiment, a polymer interlayer comprises: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has a glass transition temperature less than about 20° C. and a peak tan delta of greater than 1.29, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

In an embodiment, at least one of the difference between the first residual hydroxyl content and the second residual hydroxyl content and the difference between the first residual acetate content and the second residual acetate content is at least 2.0 weight percent.

In an embodiment, a polymer interlayer comprises: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has a glass transition temperature less than about 20° C. and a peak tan delta of greater than 1.29; and wherein at least one of the difference between the first residual hydroxyl content and the second residual hydroxyl content and the difference between the first residual acetate content and the second residual acetate content is at least 2.0 weight percent, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

In an embodiment, a polymer interlayer comprises: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has a glass transition temperature less than about 20° C. and a peak tan delta of greater than 1.29; and wherein the difference between the first residual hydroxyl content and the second residual hydroxyl content is at least 2.0 weight percent, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

In an embodiment, a polymer interlayer comprises: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has a glass transition temperature less than about 20° C. and a peak tan delta of greater than 1.29; and wherein the difference between the first residual acetate content and the second residual acetate content is at least 2.0 weight percent, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

In embodiments, the polymer interlayer has a sound insulation, $TL_w$, greater than 41.5 decibels, 42 decibels, 42.5 decibels, or greater than 43 decibels, or greater than 44 decibels, or greater than 45 decibels, or greater than 46 decibels as measured by weighted average sound transmission loss at 2000 to 8000 Hz. In embodiments, the polymer interlayer has sound insulation, $TL_c$, of greater than 38 decibels at the coincident frequency, or greater than 38.5 decibels, or greater than 39 decibels, or greater than 39.5 decibels, or greater than 40 decibels, or greater than 41 decibels at the coincident frequency.

In an embodiment, a polymer interlayer comprises: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has a glass transition temperature less than about 20° C. and a peak tan delta of greater than 1.33; and wherein the difference between the first residual hydroxyl content and the second residual hydroxyl content is at least 2.0 weight percent and the difference between the first residual acetate content and the second residual acetate content is at least 2.0 weight percent, and a glass panel having a configuration of 2.3-mm glass// interlayer//2.3-mm glass and at 20° C. has a transmission loss, $TL_w$, of greater than 42 decibels as measured by weighted average sound transmission loss at 2000 to 8000 Hz, and a transmission loss, $TL_c$, of greater than 38 decibels at the coincident frequency.

In embodiments, the first plasticizer and the second plasticizer are the same. In embodiments, the first plasticizer and the second plasticizer are different. In embodiments, at least one of the first plasticizer and the second plasticizer comprises an aromatic moiety.

In embodiments, the polymer interlayer has a glass transition temperature less than about 19° C., or less than 18° C., or less than 17° C., or less than 16° C., or less than 15° C., or less than 12° C., or less than 10° C., or less than 5° C., or less than 0° C., or less than −5° C. In embodiments, the polymer interlayer has a peak tan delta of greater than 1.30, or greater than 1.31, or greater than 1.32, or greater than 1.33, or greater than 1.34, or greater than 1.35, or greater than 1.36, or greater than 1.37, or greater than 1.38, or greater than 1.39, or greater than 1.40, or greater than 1.42, or greater than 1.45, or greater than 1.50, or greater than 1.60.

In embodiments, the difference between the first residual hydroxyl content and the second residual hydroxyl content is at least 3.0 weight percent and the difference between the first residual acetate content and the second residual acetate content is at least 3.0 weight percent. In embodiments, the difference between the first residual hydroxyl content and the second residual hydroxyl content is at least 4.0 weight percent, or at least 5.0 weight percent, or at least 6.0 weight percent, or at least 7.0 weight percent, or at least 8.0 weight percent, or at least 9.0 weight percent, or at least 10.0 weight percent, or at least 12.0 weight percent, or at least 15.0 weight percent, or at least 18.0 weight percent, or at least 21.0 weight percent, or at least 24.0 weight percent, or at least 28.0 weight percent. In embodiments, the difference between the first residual acetate content and the second residual acetate content is at least 4.0 weight percent, or at least 5.0 weight percent, or at least 6.0 weight percent, or at least 7.0 weight percent, or at least 8.0 weight percent, or at least 9.0 weight percent, or at least 10.0 weight percent, or at least 12.0 weight percent, or at least 14.0 weight percent, or at least 16.0 weight percent, or at least 18.0 weight percent, or at least about 20.0 weight percent, or at least 24.0 weight percent, or at least 29.0 weight percent.

A multiple layer panel is also disclosed. The multiple layer panel comprises at least one rigid substrate, and a polymer interlayer or multiple layer polymer interlayer as disclosed herein. The panel has improved acoustic properties, and specifically improved sound insulation properties.

A method of making a polymer interlayer is also disclosed, wherein the interlayer is as disclosed herein. The polymer interlayer may be a single layer or a multiple layer polymer interlayer.

In certain embodiments, the rigid substrate is glass. In other embodiments, the panel may further comprise a photovoltaic cell, with the interlayer encapsulating the photovoltaic cell.

DESCRIPTION OF THE PREFERRED EMBODIMENT(S)

Described herein, among other things, are interlayers comprised of a thermoplastic resin, and at least one plasticizer, wherein the interlayers have been produced to have improved acoustic properties, such as improved sound insulation. Also described are multiple layer glass panels comprising the interlayers, and methods of making the polymer interlayers. The use of the thermoplastic polymer interlayer, when selected to have a glass transition temperature less than about 20° C. and a peak tan delta (tan δ) of greater than 1.33, results in an interlayer having excellent sound insulation properties, as measured by at least Sound Transmission Loss (STL). As a result, sound reducing multiple layer glass panels are produced.

Acoustic performance in a glass panel, such as a windshield or a building window, has been achieved by providing a soft interlayer, or in a multilayer, a softer core layer and stiffer outer or skin layers. It has been determined by the inventors that improved acoustic performance, such as increased Sound Transmission Loss and better sound insulation, can be achieved by changing other properties of the interlayer, which then changes the properties of a glass panel containing the interlayer. The inventors have discovered that when the glass transition temperature of an interlayer is less than about 20° C., there is a correlation between sound insulation of a glass panel and the peak tan delta (tan δ) of an interlayer (or the core layer of a multilayer interlayer). The peak tan delta can be controlled and increased by selecting specific materials and formulating the interlayer as further described below.

As used herein, the terms "multilayer" and "multiple layers" mean an interlayer having more than one layer, and multilayer and multiple layer may be used interchangeably. The layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Multilayer interlayers, such as an interlayer having two or more layers (such as a trilayer interlayer having three layers) can comprise at least one soft layer and at least one stiff layer. The soft layer(s) is often the inner or core layer in interlayers having at least three layers. Some terminology used throughout this application will be explained to provide a better understanding of the invention. The terms "polymer interlayer sheet," "interlayer," "polymer layer", and "polymer melt sheet" as used herein, generally may designate a single-layer sheet or a multilayered interlayer. A "single-layer sheet," as the name implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; a combination of a single-layer sheet and a plural-layer sheet; and a combination of at least one plural-layer sheet and at least one co-extruded sheet. In various embodiments of the present disclosure, a multilayered interlayer comprises at least two polymer layers (e.g., a single layer or multiple layers co-extruded and/or laminated together) disposed in direct contact with each other, wherein each layer comprises a polymer resin, as detailed more fully below. As used herein for multilayer interlayers having at least three layers, "skin layer" generally refers to the outer layers of the interlayer and "core layer" generally refers to the inner layer(s). Thus, one exemplary embodiment would be: skin layer//core layer//skin layer. In the multilayer interlayers having skin layer//core layer//skin layer configuration, in some embodiments the skin layer maybe stiffer and the core layer may be softer, while in other embodiments the skin layer may be softer and the core layer may be stiffer. It should be noted, however, further embodiments include interlayers having only two layers or interlayers having more than three layers (e.g., 4, 5, 6, or up to 10 or more individual layers). Additionally, any multilayer interlayer utilized can be varied by manipulating the composition, thickness, or positioning of the layers and the like. For example, in one trilayer polymer interlayer sheet, the two stiff (or outer or skin) layers may comprise poly(vinyl butyral) ("PVB") resin with a plasticizer or mixture of plasticizers, while the softer (inner or core) layers may comprise the same or different PVB resin or a different thermoplastic material with a the same or different plasticizer and/or mixture of plasticizers. Thus, it is contemplated that the stiff or skin layers and the soft or core layer(s) of the multilayered interlayer sheets may be comprised of the same thermoplastic material or different thermoplastic materials and the same or different plasticizer or plasticizers. Either or both layers may include additional additives as known in the art, as desired.

As used herein, the sound insulation property of a glass panel in the frequency region of interest can be represented by the weighted average transmission loss (TL), or $TL_w$. The $TL_w$ of a glass panel at 2000 to 8000 Hz is obtained from the equation (2):

$$TL_w = 10 \times \log((\Sigma(10^{TL_i/10}))/k) \quad (2)$$

where $TL_i$ is the transmission loss (TL) at ⅓ octave frequency band i in the frequency region from 2000 to 8000 Hz; i=1 to k, k is the number of ⅓ octave bands from 2000 to 8000 Hz (k=7). Glass panels having better sound insulation will have a higher $TL_w$ and Sound Transmission Loss at the coincident frequency ($TL_c$); conversely, glass panels having either lower $TL_w$ or $TL_c$ or both lower $TL_w$ and $TL_c$ will have poorer sound insulation.

As used herein, "Sound Transmission Loss" in the frequency region from 2000 to 8000 Hz is determined for a laminate containing an interlayer, such as the interlayer of the present invention or a comparative interlayer, in accordance with ASTM E90 (2009) at a fixed temperature of 20° C. The interlayers are laminated with 2.3 mm clear glass (having a configuration of 2.3 mm glass//interlayer//2.3 mm glass). The glass panel has dimensions of 50 cm by 80 cm. The sound transmission loss measurements of the test panel at 2000, 2500, 3150, 4000, 5000, 6300, and 8000 Hz are used to calculate the weighted average sound transmission loss ($TL_w$) according to equation (2) in the frequency region of 2000 to 8000 Hz.

The present invention also discloses a multilayer interlayer comprising (a) a stiffer layer, (b) a softer layer comprising a polyvinyl butyral resin having a residual hydroxyl content less than about 15 weight percent (wt. %), and (c) a plasticizer, wherein the interlayer has at least one glass transition temperature less than about 20° C. and peak tan delta (tan δ) of greater than 1.29, and the glass panels comprising the interlayer of the present invention and having a 2.3-mm glass//interlayer//2.3-mm glass configuration have a sound insulation, $TL_w$, at 20° C., of greater than 41 decibels as measured by weighted average sound transmission loss at 2000 to 8000 Hz, and a $TL_c$ greater than 38 decibels at the coincident frequency.

As used herein, the tan delta (tan δ) can be obtained from the glass transition of a polymer interlayer. Glass transition of a polymer interlayer is the state from the "glassy" state into the rubbery state, which is reversible; the glass transition temperature is the temperature that marks the transition from the glassy state to the rubbery state. At the glass transition state, the polymer interlayer provides the highest acoustic damping, and the glass transition temperature is used to characterize the acoustic insulation property of the polymer. The glass transition temperature ($T_g$) can be determined by dynamical mechanical thermal analysis (DMTA) in shear mode. The DMTA measures the storage (elastic) modulus (G') in Pascals, loss (viscous) modulus (G") in Pascals, tan delta (=G"/G') of the specimen as a function of temperature at a given frequency, and temperature sweep rate. A frequency of 1 Hz and temperature sweep rate of 3° C./min were used herein. The $T_g$ is then determined by the position of the tan delta peak on the temperature scale in ° C. and the tan delta peak value is referred as tan delta or peak tan delta. As used herein, "tan delta", "peak tan delta", "tan δ" and "peak tan δ" may be used interchangeably.

As used herein, a "soft layer" or "softer layer" is the layer having a glass transition temperature less than about 20° C. As used herein, a "stiff layer" or "stiffer layer" generally refers to a layer that is stiffer or more rigid than another layer and that has a glass transition temperature that is generally at least two degrees C. (2° C.) higher than another layer (such as the softer layer).

In embodiments, the interlayer comprises a soft polymer layer comprising a plasticizer having one or more aromatic moieties. It has been discovered that the use of a plasticizer having one or more aromatic moieties significantly increases the tan delta of the interlayer compared to interlayers having only a conventional plasticizer without aromatic moieties, as further discussed below. In embodiments, the plasticizer may be a high refractive index plasticizer.

In various embodiments, the polymer interlayer comprises a soft layer that exhibits at least one glass transition less than about 20° C., or less than about 19° C., or less than about 18° C., or less than about 17° C., or less than about 16° C., or less than about 15° C., or less than about 10° C., or less than about 5° C., or less than about 0° C., or less than about −5° C., or less than about −10° C. In embodiments, the tan delta is greater than 1.29, greater than 1.30, greater than 1.3, greater than 1.32, greater than 1.33, or greater than 1.34, or greater than 1.35, or greater than 1.36, or greater than 1.37, or greater than 1.38, or greater than 1.39, or greater than 1.40, or greater than 1.45, or greater than 1.50, or greater than 1.55, or greater than 1.60, or greater than 1.65, or greater than 1.70, or greater than 1.75, or greater than 1.80, or greater than 1.85, or greater than 1.90, or greater than 1.95, or greater than 2.00.

In various embodiments, the interlayers of the present invention, when used in a glass panel having a 2.3-mm glass//interlayer//2.3-mm glass configuration at 20° C. have sound insulation, $TL_w$, greater than 41.5 decibels ("dB"), or greater than 42 decibels, or greater than 42.5 decibels, or greater than 43 decibels, or greater than 44 decibels, or greater than 45 decibels, or greater than 46 decibels as measured by weighted average sound transmission loss at 2000 to 8000 Hz. In various embodiments, the interlayers of the present invention have sound insulation, $TL_c$, (when in a glass panel having a 2.3-mm glass//interlayer//2.3-mm glass configuration and at 20° C.) of greater than 38 decibels at the coincident frequency, or greater than 38.5 decibels, or greater than 39 decibels, or greater than 40 decibels, or greater than 41 decibels, or greater than 42 decibels at the coincident frequency.

In various embodiments, the polymer interlayer comprises a poly(vinyl acetal) resin layer. In other embodiments, when the polymer interlayer comprises at least a first polymer layer and a second polymer layer, at least one of the polymer layers comprises a poly(vinyl acetal) resin, such as poly(vinyl butyral), and a plasticizer. In further embodiments, all polymer layers comprise poly(vinyl acetal) resins or poly(vinyl butyral) resins and plasticizers. The residual hydroxyl and residual acetate contents in at least one of the poly(vinyl acetal) resins and the type and amount of plasticizer(s) to be mixed with the resin(s) are selected such that the glass transition temperature of the resulting layer is less than about 20° C. and tan delta (tan δ) is greater than 1.33.

As used herein, residual hydroxyl content (calculated as % vinyl alcohol content or poly(vinyl alcohol) (PVOH) by weight) in poly(vinyl acetal) refers to the amount of hydroxyl groups remaining on the polymer chains after processing is complete. For example, poly(vinyl butyral) (PVB) can be manufactured by hydrolyzing poly(vinyl acetate) to poly(vinyl alcohol (PVOH), and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished PVB resin, there typically will be residual acetate groups (as vinyl acetate groups) and residual hydroxyl groups (as vinyl hydroxyl groups) as side groups on the polymer chain. As used herein, residual acetate content (calculated as % vinyl acetate content or poly(vinyl acetate) (PVAc) by weight in poly(vinyl acetal)) refers to the amount of residual acetate groups remaining on the polymer chains. As used herein, residual hydroxyl content and residual acetate content is measured on a weight percent basis per ASTM D1396.

In various embodiments, the polymer interlayer comprises a soft layer comprising a plasticizer having one or more aromatic moiety. Examples of the plasticizer having one or more aromatic moiety include, but are not limited to, dipropylene glycol dibenzoate, tripropylene glycol dibenzoate, polypropylene glycol dibenzoate, isodecyl benzoate, 2-ethylhexyl benzoate, diethylene glycol dibenzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, bis-(methoxyethyl) terephthalate, bis-(butoxyethyl) terephthalate, bis-(butoxyethoxyethyl) terephthalate, bis-(ethoxyethoxyethyl) terephthalate, bis-(2ethylhexyloxyethyl) terephthalate, 2-ethylhexyloxyethyl benzoate, 2-ethyl hexyl oxyethoxyethyl) benzoate, ethoxyethoxyethyl benzoate, butoxyethoxyethyl benzoate, butoxyethoxyethoxyethyl benzoate, and mixtures thereof. In some embodiments, examples of plasticizers having one or more aromatic moiety are dipropylene glycol dibenzoate, 2,2,4-trimethyl-1,3-pentanediol dibenzoate, bis-(butoxyethyl) terephthalate, bis-(butoxyethoxyethyl) terephthalate, tripropylene glycol dibenzoate, and mixtures thereof.

In various embodiments, the polymer interlayer comprises a soft layer comprising at least one plasticizer having one or more aromatic moiety and at least one conventional plasticizer. In other embodiments, the soft layer comprises at least one conventional plasticizer. As used herein, a "conventional plasticizer" is a plasticizer having no aromatic moiety. Examples of conventional plasticizers include, but not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate), dihexyl adipate, dioctyl adipate, hexyl cyclohexyladipate, diisononyl adipate, heptylnonyl adipate, dibutyl sebacate, dioctyl sebacate, di(butoxyethyl) adipate, and bis(2-(2-butoxyethoxy)ethyl) adipate, and mixtures thereof.

In various embodiments of interlayers of the present disclosure, the interlayer comprises a soft layer comprising about 0 to 100, about 10 to about 80 phr, about 20 to about 70 phr, about 30 to about 60 phr, or greater than 5 phr, or greater than 10 phr, or greater than 15 phr, or greater than 20 phr, or greater than 25 phr, or greater than 30 phr, or greater than 35 phr, or greater than 40 phr, or less than 100 phr, or less than 90 phr, or less than 80 phr, or less than 70 phr, or less than 60 phr total plasticizer. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the mix or melt that was used to produce the interlayer.

While the ranges and limits of the residual hydroxyl and/or residual acetate contents of the poly(vinyl acetal) resins and the plasticizer used for the softer layer are selected such that the interlayer has a glass transition temperature less than about 20° C. and a tan delta of greater than 1.33 can be those previously discussed, in embodiments it is advantageous if the residual hydroxyl and residual acetate contents of the poly(vinyl acetal) resins are selected such that the resins have high level of compatibility with a plasticizer. Poly(vinyl acetal) resins having higher or lower residual hydroxyl contents and/or residual acetate contents can, when combined with at least one plasticizer, ultimately include different amounts of plasticizer. The compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. In this regard, it is desirable that the resins having higher compatibility with a plasticizer are chosen for the softer layer or interlayer of the present invention. In the multilayer interlayer comprising a softer layer and a stiffer layer, the resins having lower compatibility with a plasticizer are chosen for the stiffer layer. Resins having higher compatibility with a plasticizer can generally include resins having lower residual hydroxyl content and/or having residual acetate content greater than 4 wt. %, and these resins are particularly useful for the softer layer, while resins having lower residual hydroxyl content and/or having residual acetate content greater than 4 wt. % require lower amounts of plasticizer to provide a softer layer having glass transition temperature less than 20° C. and a higher peak tan delta of greater than 1.29. For example, if two poly(vinyl acetal) resins having the same residual acetate content and different residual hydroxyl contents (one of the resins has a lower residual hydroxyl content and the other resin has a higher residual hydroxyl) are each individually plasticized with the same plasticizer to each form a layer or an interlayer having the same glass transition temperature of 5° C., the layer with the lower residual hydroxyl content resin will require a lower amount of plasticizer than the layer with the higher residual hydroxyl content to have the same glass transition temperature of 5° C. The layer containing the lower level of plasticizer will have a higher tan delta and the layer containing the higher level of plasticizer will have a lower tan delta. As another example, if two poly(vinyl acetal) resins having the same residual hydroxyl content and different residual acetate contents (one resin has a lower residual acetate content and the other resin has a higher residual acetate content) are individually plasticized with the same plasticizer to each for a layer or an interlayer having the same glass transition temperature of 5° C., the layer with the lower residual acetate resin will contain a higher amount of plasticizer than the layer having the higher residual acetate content resin to form a layer having the same glass transition temperature of 5° C. The layer containing the higher amount of plasticizer will have a lower tan delta than the layer containing the lower amount of plasticizer will have a higher tan delta. The use of the resins having a lower residual hydroxyl content and/or having a residual acetate content greater than 4 wt. % in combination with a lower amount of plasticizer results in the softer layer having a glass transition temperature less than about 20° C. and a tan delta of greater than 1.29.

In embodiments, the residual hydroxyl content in the poly(vinyl acetal) resins and the amount of conventional plasticizer(s) are chosen such that the resulting softer layer has a glass transition temperature less than about 20° C. and a tan delta of greater than 1.29. The residual hydroxyl content can be at least about 7 wt. %, or at least about 8 wt. %, or at least about 9 wt. %, or at least about 10 wt. %, or at least about 11 wt. % and/or not more than about 15 wt. %, or not more than about 14 wt. %, or not more than about 13 wt. %, or not more than about 11.5 wt. %, or not more than about 11 wt. %, or not more than about 10.5 wt. %, or not more than about 10 wt. %, or not more than about 9.5 wt. %, or not more than about 9 wt. %, or in the range of from about 7 to about 15 wt. %, or about 8 to about 14 wt. %, or about 9 to about 13 wt. %, and the plasticizer content can be less than about 80 phr, less than about 70 phr, less than about 60 phr, or less than about 50 phr, and/or greater than about 10 phr, or greater than about 20 phr, or greater than about 30 phr. If the amount or level of plasticizer is 80 phr or more, the compatibility of the resin and plasticizer is reduced and tan delta of the softer layer will be decreased to less than 1.33. In embodiments, a particularly useful range of plasticizer is from 45 to 70 phr, and a particularly useful range for the residual hydroxyl content is from 8 to 12 wt. %.

In embodiments, the residual hydroxyl content in the poly(vinyl acetal) resins and the amount of plasticizer(s) having at least one aromatic moiety are chosen such that the resultant softer layer has a glass transition temperature less than about 20° C. and tan delta of greater than 1.29. In this regard, the residual hydroxyl content can be at least about 7 wt. %, or at least about 8 wt. %, or at least about 9 wt. %, or at least about 10 wt. %, or at least about 11 wt. % and/or not more than about 15 wt. %, or not more than about 14 wt. %, or not more than about 13 wt. %, or not more than about 11.5 wt. %, or not more than about 11 wt. %, or not more than about 10.5 wt. %, or not more than about 10 wt. %, or not more than about 9.5 wt. %, or not more than about 9 wt. %, or in the range of from about 7 to about 15 wt. %, or about 8 to about 14 wt. %, or about 9 to about 13 wt. %, and the plasticizer content can be less than about 100 phr, or less than about 90 phr, or less than about 80 phr, or less than about 70 phr, or less than about 60, or less than about 50 phr and/or greater than about 10 phr, or greater than about 20 phr, or greater than about 30 phr. In embodiments, a particularly useful range for the residual hydroxyl content is from 8 to 12 wt. %, and a particularly useful range for the plasticizer content is from 70 to 100 phr.

In embodiments, the residual acetate content in the poly(vinyl acetal) resins and the amount of plasticizer(s) can be chosen such that the resultant softer layer has a glass transition temperature less than about 20° C. and tan delta of greater than 1.29. In this regard, the residual acetate content can be greater than 4 wt. %, or greater than 5 wt. %, or greater than 6 wt. %, or greater than 7 wt. %, or greater than 8 wt. %, or greater than 9 wt. %, or greater than 10 wt. %, or greater than 15 wt. %, greater than 20 wt. %, greater than 25 wt. %, or greater than 30 wt. %, and the plasticizer content can be less than about 80 phr, or less than about 70 phr, or less than about 60 phr, or less than about 50 phr and/or greater than about 10 phr, or greater than about 20 phr, or greater than about 30 phr. In embodiments, a particularly useful range for the residual acetate is from 10 to 18 wt. %. The plasticizer can be a conventional plasticizer or a plasticizer having one or more aromatic moiety or a mixture of two or more plasticizers. When the plasticizer is a conventional plasticizer, the particularly useful range of plasticizer is from 40 to 75 phr. When at least one plasticizer having at least one aromatic moiety is used, the amount of plasticizer in the interlayer is higher than the amount of plasticizer in the interlayer not having a plasticizer with at least one aromatic moiety.

In embodiments, the residual acetate content and residual hydroxyl content in the poly(vinyl acetal) resins and the amount of plasticizer(s) can be chosen such that the resultant softer layer has a glass transition temperature less than about 20° C. and tan delta of greater than 1.29. In this regard, the residual acetate content can be greater than 4 wt. %, or greater than 5 wt. %, or greater than 6 wt. %, or greater than 7 wt. %, or greater than 8 wt. %, or greater than 9 wt. %, or greater than 10 wt. %, or greater than 15 wt. %, greater than 20 wt. %, greater than 25 wt. %, or greater than 30 wt. %; the residual hydroxyl content can be at least about 7 wt. %, or at least about 8 wt. %, or at least about 9 wt. %, or at least about 10 wt. %, or at least about 11 wt. % and/or not more than about 15 wt. %, or not more than about 14 wt. %, or not more than about 13 wt. %, or not more than about 11.5 wt.

%, or not more than about 11 wt. %, or not more than about 10.5 wt. %, or not more than about 10 wt. %, or not more than about 9.5 wt. %, or not more than about 9 wt. %, or in the range of from about 7 to about 15 wt. %, or about 8 to about 14 wt. %, or about 9 to about 13 wt. %; and the plasticizer content can be less than about 80 phr, or less than about 70 phr, or less than about 60 phr, or less than about 50 phr and/or greater than about 10 phr, or greater than about 20 phr, or greater than about 30 phr. In embodiments, a particularly useful range for the residual acetate content from 10 to 18 wt. %, a particularly useful range for the residual hydroxyl content is from 9 to 16 wt. %, and a particularly useful range for the plasticizer content of conventional plasticizer is from 50 to 75 phr. When at least one plasticizer having at least one aromatic moiety is used, the amount of plasticizer in the interlayer is higher than the amount of plasticizer in the interlayer not having a plasticizer with at least one aromatic moiety.

In various embodiments, the polymer interlayer comprises at least a first poly(vinyl acetal) polymer layer having a first poly(vinyl acetal) resin and a second poly(vinyl acetal) polymer layer having a second poly(vinyl acetal) resin wherein at least one of the first and second poly(vinyl acetal) layers is the softer layer. The softer layer can have the residual hydroxyl content, residual acetate content, and plasticizer type and amount within the ranges and limits provided above for the softer layer and have a glass transition temperature less than 20° C. and a tan delta of greater than 1.29. In other embodiments, one of the first and second poly(vinyl butyral) layers is the softer layer and the other layer is the stiffer layer. The first and second poly(vinyl acetal) resins in the polymer interlayer can have the same or different compositions. For example, in some embodiments, the first poly(vinyl acetal) resin can have a residual hydroxyl content and/or residual acetate content that is at least about 0.5, or at least about 1.0, or at least about 1.5, or at least about 2.0, or at least about 2.5, or at least about 3.0, at least about 4.0, at least about 5.0, at least about 6.0, or at least about 7.0, or at least about 8.0 wt. % higher or lower than the residual hydroxyl content and/or residual acetate content of the second poly(vinyl acetal) resin. One or more additional poly(vinyl acetal) polymer layer(s) may also be present in the interlayer and can have a residual hydroxyl content and/or a residual acetate content within the ranges provided above. Additionally, the residual hydroxyl content of the one or more additional poly(vinyl acetal) layer(s) can be the same as or different from the residual hydroxyl content and/or the residual acetate content of the first and/or second poly(vinyl acetal) layers.

The difference between the residual hydroxyl content of the first and second poly(vinyl acetal) resins could also be at least about 2, at least about 5, at least about 10, at least about 12, at least about 15, at least about 20, or at least about 30 weight percent (wt. %). As used herein, the term "weight percent different" or "the difference . . . is at least . . . weight percent" refers to a difference between two given weight percentages, calculated by subtracting the one number from the other. For example, a poly(vinyl acetal) resin having a residual hydroxyl content of 12 weight percent has a residual hydroxyl content that is 2 weight percent lower than a poly(vinyl acetal) resin having a residual hydroxyl content of 14 weight percent (14 weight percent−12 weight percent=2 weight percent). As used herein, the term "different" can refer to a value that is higher than or lower than another value. One or more other poly(vinyl acetal) layers may also be present in the interlayer and can have a residual hydroxyl within the ranges provided above. Additionally, the residual hydroxyl content of the one or more other poly(vinyl acetal) resins can be the same as or different than the residual hydroxyl content of the first and/or second poly(vinyl acetal) resins.

In some embodiments, the difference between the residual acetate content of the first and second poly(vinyl acetal) resins can be at least about 2, at least about 3, at least about 4, at least about 5, at least about 6, at least about 7, at least about 8, at least about 9, or at least about 10 weight percent, at least about 12, at least about 14, at least about 16, at least about 18, at least about 20, at least about 24, or at least 29 weight percent. One of the poly(vinyl acetal) resins may have a residual acetate content of not more than about 4, not more than about 3, not more than about 2, or not more than about 1 weight percent, measured as described above. In some embodiments, one of the first and second poly(vinyl acetal) resins can have a residual acetate content of at least about 4, at least about 5, at least about 6, at least about 7, at least about 8, at least about 9, at least about 10, at least about 12, at least about 14, at least about 16, at least about 18, at least about 20, at least about 25, or at least about 30 weight percent. In other embodiments, the first and second poly(vinyl acetate) resins both can have a residual acetate content of at least 4, at least about 5, at least about 6, at least about 7, at least about 8, at least about 9, at least about 10, at least about 12, at least about 14, at least about 16, at least about 18, or at least about 20 wt. %. The difference in the residual acetate content between the first and second poly(vinyl acetal) resins can be within the ranges provided above, or the difference can be less than about 3, not more than about 2, not more than about 1, or not more than about 0.5 weight percent. Additional poly(vinyl acetal) layers present in the interlayer can have a residual acetate content the same as or different from the residual acetate content of the first and/or second poly(vinyl acetal) resin.

In some embodiments, the difference between the residual hydroxyl content of the first and second poly(vinyl acetal) resins can be less than about 2, not more than about 1, not more than about 0.5 weight percent and the difference in the residual acetate content between the first and second poly(vinyl acetal) resins can be at least about 3, at least about 4, at least about 5, at least about 6, at least about 7, at least about 8, at least about 10, at least about 15, at least about 20, or at least about 30 weight percent. In other embodiments, the difference in the residual acetate content of the first and second poly(vinyl acetal) resins can be less than about 3, not more than about 2, not more than about 1, or not more than about 0.5 weight percent and the difference in the residual hydroxyl content of the first and second poly(vinyl acetal) resins can be at least about 2, at least about 5, at least about 10, at least about 12, at least about 15, at least about 20, or at least about 30 weight percent.

In embodiments, at least one of the difference between the first residual hydroxyl content and the second residual hydroxyl content and the difference between the first residual acetate content and the second residual acetate content is at least 2.0 weight percent, or the difference between the first residual hydroxyl content and the second residual hydroxyl content and the difference between the first residual acetate content and the second residual acetate content are both at least 2.0 weight percent, or the difference between the first residual hydroxyl content and the second residual hydroxyl content is at least 2.0 weight percent and the difference between the first residual acetate content and the second residual acetate content is less than 2.0 weight percent, or the difference between the first residual hydroxyl content and the second residual hydroxyl content is less than 2.0 weight percent and the difference between the first residual acetate content and the second residual acetate content is at least 2.0 weight percent.

In various embodiments, the differences in residual hydroxyl and/or residual acetate content of the first and second poly(vinyl acetal) resins can be selected to control or provide certain performance properties, such as strength, impact resistance, penetration resistance, processability, or acoustic performance to the final composition, layer, or interlayer. For example, poly(vinyl acetal) resins having a higher residual hydroxyl content, such as greater than about 16 weight percent, can facilitate high impact resistance, penetration resistance, and strength to a resin composition or layer, while lower hydroxyl content resins, such as having a residual hydroxyl content of less than 15 weight percent, can improve the acoustic performance of the interlayer.

In various embodiments of the interlayers comprising a softer poly(vinyl acetal) layer and a stiffer poly(vinyl acetal) layer, the softer layer can comprise the plasticizer(s) in the ranges and limits provided above, and the stiffer layer can have a plasticizer content of at least 8 phr less than the plasticizer content in the softer layer, or at least 10 phr, or at least 12 phr, or at least 14 phr, or at least 16 phr, or at least 18 phr, or at least 20 phr, or at least 22 phr, or at least 24 phr, or at least 26 phr, or at least 28 phr, or at least 30 phr, or at least 32 phr, or at least 34 phr, or at least 36 phr, or at least 38 phr, or at least 40 phr, or at least 45 phr, or at least 50 phr less than the plasticizer content in the softer layer. Each respective layer's plasticizer content at the equilibrium state is determined by the layer's respective residual hydroxyl contents and/or residual acetate contents, as disclosed in U.S. Pat. No. 7,510,771 (the entire disclosure of which is incorporated herein by reference).

The plasticizer content in the stiffer (or skin) layer(s) or softer (or core) layer(s) can be different from the total plasticizer content. The total plasticizer content can be from 0 to 120 phr, or greater than 0 phr, or greater than 5 phr, or greater than 10 phr, or greater than 15 phr, or greater than 20 phr, or greater than 25 phr, or greater than 30 phr and/or 120 phr or less, or 115 phr or less, or 110 phr or less, or 105 phr or less, or 100 phr or less, or 95 phr or less, or 90 phr or less, or 85 phr or less, or 80 phr or less, or 75 phr or less, or 70 phr or less, or within the range of 10 to 100 phr, or 20 to 80 phr, or 30 to 70 phr. In addition, the stiffer (or skin) layer(s) and softer (or core) layer(s) can have different plasticizer types and plasticizer contents, in the ranges previously discussed. For example, at equilibrium the interlayer could comprise two stiffer skin layers, each with 38 phr plasticizer, and a softer core layer with 75 phr plasticizer, for a total plasticizer amount for the interlayer of about 54.3 phr when the combined skin layer thickness equals that of the core layer.

The interlayers of the present disclosure may have glass transition temperatures of about 26° C. or greater, about 30° C. or greater, or about 35° C. or greater for the stiffer layer(s), and about 10° C. or less, or about 4° C. or less, or about −5° C. or less, or about −10° C. or less for the soft layer(s). In some embodiments, the multilayered interlayers of the present disclosure combine these two advantageous properties (i.e., strength and acoustic) by utilizing harder or stiffer skin layers laminated with a softer core layer (e.g., stiff//soft//stiff) and softer skin layers laminated with a stiffer core layer (e.g., soft//stiff//soft), while also maintaining other important performance properties. In various embodiments, the multilayered interlayers generally comprise stiffer layer(s) with a glass transition temperature of about 26° C. to about 60° C., 26° C. to about 40° C., about 26° C. to 35° C., about 26° C. or greater, about 30° C. or greater, and about 35° C. or greater, and softer layer(s) of about 20° C. or less, about 10° C. or less, or about 4° C. or less, or about −5° C. or less, or about −10° C. or less, or in the range of from −20 to 20° C., or −10 to 20° C., or 0 to 10° C., or 15 to 20° C. In embodiments where the interlayer comprises a soft layer and a stiff layer, a particularly useful range for the glass transition temperature of the soft layer is from about −9 to 9° C. In embodiments where the interlayer is a monolithic interlayer, a particularly useful range for the glass transition temperature is from about 10 to 19° C. Although many of the embodiments described above refer to the polymer resin as being poly(vinyl acetal) resin, it would be understood by one of ordinary skill in the art that the polymer may be any polymer suitable for use in a multiple layer panel. Typical polymers include, but are not limited to, polyvinyl acetals (PVA) (such as poly(vinyl butyral) (PVB) or poly(vinyl isobutyral), an isomer of poly(vinyl butyral) and also referred as PVB or PVisoB, aliphatic polyurethane (PU), poly(ethylene-co-vinyl acetate) (EVA), polyvinylchloride (PVC), poly(vinylchloride-co-methacrylate), polyethylenes, polyolefins, ethylene acrylate ester copolymers, poly(ethylene-co-butyl acrylate), silicone elastomers, epoxy resins, and acid copolymers such as ethylene/carboxylic acid copolymers and its ionomers, derived from any of the foregoing possible thermoplastic resins, combinations of the foregoing, and the like. PVB and its isomer polyvinyl isobutyral, polyvinyl chloride, ionomers, and polyurethane are suitable polymers generally for interlayers; PVB and its isomer (PVisoB) are particularly suitable.

Polyurethanes can have different hardnesses. An exemplary polyurethane polymer has a Shore A hardness less than 85 per ASTM D-2240. Examples of polyurethane polymers are AG8451 and AG5050, aliphatic isocyanate polyether based polyurethanes having glass transition temperatures less than 20° C. (commercially available from Thermedics Inc. of Woburn, Mass.). EVA polymers (or copolymers) can contain various amounts of vinyl acetate groups. The desirable vinyl acetate content is generally from about 10 to about 90 mol %. EVA with lower vinyl acetate content can be used for sound insulation at low temperatures. The ethylene/carboxylic acid copolymers are generally poly(ethylene-co-methacrylic acid) and poly(ethylene-co-acrylic acid) with the carboxylic acid content from 1 to 25 mole %. Ionomers of ethylene/carboxylic acid copolymers can be obtained by partially or fully neutralizing the copolymers with a base, such as the hydroxide of alkali (sodium for example) and alkaline metals (magnesium for example), ammonia, or other hydroxides of transition metals such as zinc. Examples of ionomers of that are suitable include Surlyn® ionomers resins (commercially available from DuPont of Wilmington, Del.).

Examples of exemplary multilayer interlayer constructs include, but are not limited to, PVB//PVisoB//PVB, where the PVisoB layer comprises two or more resins having different residual hydroxyl contents or different polymer compositions; PVC//PVB//PVC, PU//PVB//PU, Ionomer//PVB//Ionomer, Ionomer//PU//Ionomer, Ionomer//EVA//Ionomer, where the core layer PVB (including PVisoB), PU or EVA comprises two or more resins having different glass transitions. Alternatively, all layers may all be PVB using the same or different starting resins, having the same or different residual hydroxyl and residual acetate contents. Other combinations of resins and polymers will be apparent to those skilled in the art.

While generally referred to as poly(vinyl acetal) or poly(vinyl butyral), any of the poly(vinyl acetal) resins can include residues of any suitable aldehyde, such as isobutyraldehyde, as previously discussed. In some embodiments, one or more poly(vinyl acetal) resin can include residues of at least one $C_1$ to $C_{10}$ aldehyde, or at least one $C_4$ to $C_8$ aldehyde. Examples of suitable $C_4$ to $C_8$ aldehydes can include, but are not limited to, n-butyraldehyde, isobutyraldehyde, 2-methylvaleraldehyde, n-hexyl aldehyde, 2-ethylhexyl aldehyde, n-octyl aldehyde, and combinations thereof. At least one of the first and second poly(vinyl acetal) resins can include at least about 20, at least about 30, at least about 40, at least about 50, at least about 60, or at least about 70 weight percent of residues of at least one $C_4$ to $C_8$ aldehyde, based on the total weight of aldehyde residues of the resin, and/or can include not more than about 90, not more than about 85, not more than about 80, not more than about 75, not more than about 70, or not more than about 65 weight percent of at least one $C_4$ to $C_8$ aldehyde, or in the range of from about 20 to about 90, about 30 to about 80, or about 40 to about 70 weight percent of at least one $C_4$ to $C_8$ aldehyde. The $C_4$ to $C_8$ aldehyde may be selected from the group listed above, or it can be selected from the group consisting of n-butyraldehyde, isobutyraldehyde, 2-ethylhexyl aldehyde, and combinations thereof.

In various embodiments, one or more poly(vinyl acetal) resin may be a polyvinyl n-butyral (PVB) resin. In other embodiments, one or more poly(vinyl acetal) resin can be a poly(vinyl n-butyral) resin that mainly comprises residues of n-butyraldehyde, and may, for example, include not more than about 50, not more than about 40, not more than about 30, not more than about 20, not more than about 10, not more than about 5, or not more than about 2 weight percent of residues of an aldehyde other than n-butyraldehyde, based on the total weight of all aldehyde residues of the resin.

In various embodiments, the monolithic interlayer or at least one of the polymer layers comprises a poly(vinyl acetal) resin, such as poly(vinyl butyral), and a plasticizer. In other embodiments, all polymer layers comprise poly(vinyl acetal) resins or poly(vinyl butyral) resins and plasticizers.

The PVB resin is produced by known acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a wholly owned subsidiary of Eastman Chemical Company.

The PVB resin (or resins) of the present disclosure typically has a molecular weight of greater than 50,000 Daltons, or less than 500,000 Daltons, or about 50,000 to about 500,000 Daltons, or about 70,000 to about 500,000 Daltons, or about 100,000 to about 425,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure to control the adhesion of the interlayer sheet to glass. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers, among other additives known to those of ordinary skill in the art.

The final interlayer, whether formed from extrusion or co-extrusion or by lamination of multiple layers, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art.

While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate of the present invention are formed using lamination processes known in the art.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), and about 15 mils to about 35 mils (about 0.38 to about 0.89 mm). In various embodiments, each of the layers, such as the skin and core layers, of the multilayer interlayer may have a thickness of about 1 mil to 99 mils (about 0.025 to 2.51 mm), about 1 mil to 59 mils (about 0.025 to 1.50 mm), 1 mil to about 29 mils (about 0.025 to 0.74 mm), or about 2 mils to about 28 mils (about 0.05 to 0.71 mm).

As noted above, the interlayers of the present disclosure may be used as a single layer (monolithic) sheet or a multilayered sheet. In various embodiments, the interlayers of the present disclosure (either as a single layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass) II (polymer interlayer sheet) II (polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass) II (polymer interlayer) II (photovoltaic cell) II (polymer interlayer) II (glass or polymer film).

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass) II (polymer interlayer sheet) II (glass), where the polymer interlayer sheet can comprise multilayered interlayers, as noted above. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 60° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes. The actual steps, as well as the times and temperatures, may vary as necessary, as known by one skilled in the art.

Other means for use in de-airing of the interlayer-glass interfaces (steps 2-5) known in the art and that are commercially practiced include vacuum bag and vacuum ring processes in which a vacuum is utilized to remove the air.

The invention also includes the following Embodiments 1 to 15, set forth below.

Embodiment 1 is polymer interlayer comprising: a layer comprising a poly(vinyl acetal) resin having a residual hydroxyl content and a residual acetate content, and a plasticizer, wherein the residual hydroxyl content, the residual acetate content and the plasticizer are selected such that the polymer interlayer has at least one glass transition temperature less than about 20° C. and a peak tan delta of greater than 1.33, and a glass panel having a configuration of 2.3-mm glass//interlayer//2.3-mm glass and at 20° C. has a transmission loss, $TL_w$, of greater than 42 decibels as measured by weighted average sound transmission loss at 2000 to 8000 Hz, and a transmission loss, $TL_c$, of greater than 38 decibels at the coincident frequency.

Embodiment 2 is a polymer interlayer including the features of embodiment 1, wherein the plasticizer comprises an aromatic moiety.

Embodiment 3 is a polymer interlayer including the features of any of embodiments 1 to 2, further comprising a second poly(vinyl acetal) resin.

Embodiment 4 is a polymer interlayer including the features of any of embodiments 1 to 3, further comprising a second layer.

Embodiment 5 is a polymer interlayer including the features of embodiment 4, wherein the second layer comprises a second poly(vinyl acetal) resin and a second plasticizer.

Embodiment 6 is a polymer interlayer comprising: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has at least one glass transition temperature less than about 20° C. and a peak tan delta of greater than 1.29, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

Embodiment 7 is a polymer interlayer including the features of embodiments 6, wherein at least one of the difference between the first residual hydroxyl content and the second residual hydroxyl content and the difference between the first residual acetate content and the second residual acetate content is at least 2.0 weight percent.

Embodiment 8 is a polymer interlayer comprising: a first layer comprising a first poly(vinyl acetal) resin having a first residual hydroxyl content and a first residual acetate content, and a first plasticizer; and a second layer comprising a second poly(vinyl acetal) resin having a second residual hydroxyl content and a second residual acetate content, and a second plasticizer; wherein the residual hydroxyl contents, the residual acetate contents and the plasticizers are selected such that the polymer interlayer has at least one glass transition temperature less than about 20° C. and a peak tan delta of greater than 1.29; and wherein at least one of the difference between the first residual hydroxyl content and the second residual hydroxyl content and the difference between the first residual acetate content and the second residual acetate content is at least 2.0 weight percent, and a glass panel having a configuration of 2.3-mm glass//interlayer//2.3-mm glass and at 20° C. has a transmission loss, $TL_w$, of greater than 41 decibels as measured by weighted average sound transmission loss at 2000 to 8000 Hz, and a transmission loss, $TL_c$, of greater than 38 decibels at the coincident frequency.

Embodiment 9 is a polymer interlayer including the features of any of embodiments 6 to 8, wherein the first plasticizer and the second plasticizer are the same.

Embodiment 10 is a polymer interlayer including the features of any of embodiments 6 to 8, wherein the first plasticizer and the second plasticizer are different.

Embodiment 11 is a polymer interlayer including the features of any of embodiments 6 to 10, wherein at least one of the first plasticizer and the second plasticizer comprises an aromatic moiety.

Embodiment 12 is a polymer interlayer including the features of any of embodiments 6 to 11, wherein the polymer interlayer has at least one glass transition temperature less than about 19° C. and a peak tan delta of greater than 1.35.

Embodiment 13 is a polymer interlayer including the features of any of embodiments 6 to 12, wherein the difference between the first residual hydroxyl content and the second residual hydroxyl content is at least 2.0 weight percent and the difference between the first residual acetate content and the second residual acetate content is at least 2.0 weight percent.

Embodiment 14 is a polymer interlayer including the features of any of embodiments 6 to 13, wherein the difference between the first residual hydroxyl content and the second residual hydroxyl content is at least 4.0 weight percent.

Embodiment 15 is a polymer interlayer including the features of any of embodiments 6 to 14, wherein the difference between the first residual acetate content and the second residual acetate content is at least 4.0 weight percent.

Examples

The improvements in sound transmission loss (STL) in an interlayer when increasing the tan delta of the interlayer can be most readily appreciated by a comparison of multilayer interlayers having stiffer skin layers and a soft core layer having a higher tan delta to a multilayer interlayer having a soft core layer having a lower tan delta. These Examples demonstrate that by providing a multilayer interlayer having a core layer with a higher tan delta improves the sound transmission loss of the multilayer interlayer and laminate comprising the multilayer interlayer.

The interlayers were produced by mixing and melt-extruding mixtures of poly(vinyl butyral) resin and plasticizer, and other common additives. The types of resins and plasticizers are listed below and the amounts of resins and plasticizers used are shown in the Tables below.

Figure 1:
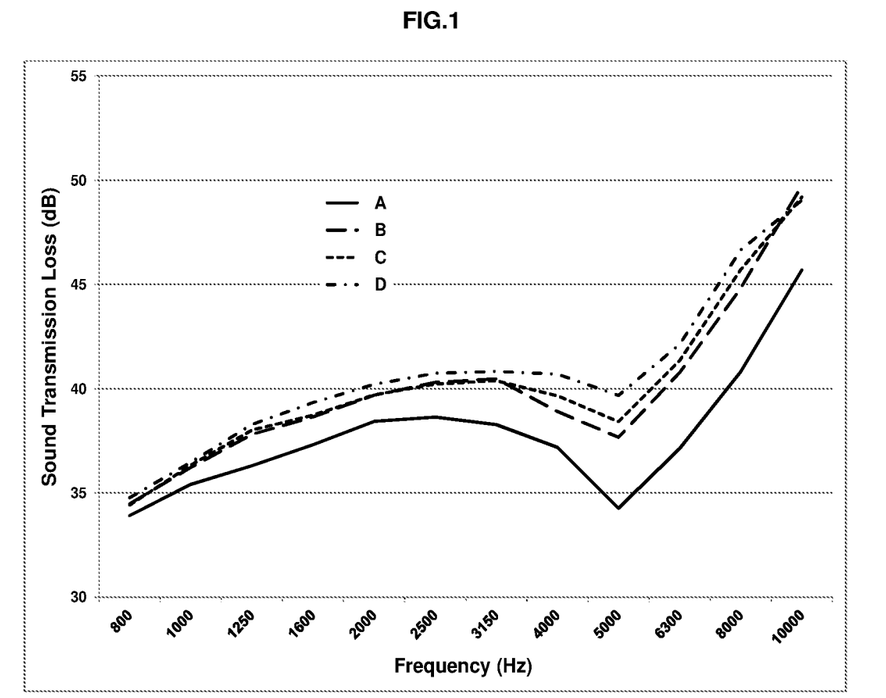
FIG. 1 is a chart showing the sound transmission loss (STL) data obtained at 20° C. for Glass Panels A to D in Table 1.

Resins Used:
Resin A: Poly(vinyl butyral) having about 19 wt. % residual hydroxyl content and about 2% residual vinyl acetate content
Resin B: Polyurethane AG5050 (an aliphatic isocyanate polyether based polyurethane film available from Thermedics Inc. of Woburn, Mass. for use with laminated glass)
Resin C*: Poly(vinyl butyral) having about 11 wt. % residual hydroxyl content and about 2% residual vinyl acetate content
Resin D*: Poly(vinyl butyral) having about 11 wt. % residual hydroxyl content and about 2% residual vinyl acetate content
Resin E*: Poly(vinyl butyral) having about 11 wt. % residual hydroxyl content and about 2% residual vinyl acetate content (Note that while Resins C, D and E have the same residual hydroxyl and residual acetate contents, Resin C had a wider molecular weight distribution than Resin D, and Resin E was made via a different acetalization process than Resin C)
Resin F: Polyurethane AG8451 (an aliphatic isocyanate polyether based polyurethane film commercially available from Thermedics Inc. of Woburn, Mass. for use with laminated glass)
Resin G: Poly(vinyl butyral) having about 16 wt. % residual hydroxyl content and about 2% residual vinyl acetate content Plasticizers Used:
3GEH Plasticizer: Tri-ethylene glycol di-2-ethylhexanoate
3GH Plasticizer: Tri-ethylene glycol di-2-ethylbutyrate
DOA Plasticizer: Dioctyl Adipate
4G7 Plasticizer: Tetraethylene glycol diheptanoate
N-40 Plasticizer: Surfonic™ N-40 (available from Huntsman Corporation, The Wandlands, Tex.)
N-60 Plasticizer: Surfonic™ N-60 (available from Huntsman Corporation, The Wandlands, Tex.)
Benzoflex 2088 Plasticizer: Benzoflex 2088 is a benzoate ester plasticizer (available from Eastman Chemical Company)
Benzoflex 9-88 Plasticizer: Benzoflex 9-88 is a benzoate ester plasticizer (available from Eastman Chemical Company)
Benzoflex 1046 Plasticizer: Benzoflex 1046 is a specialty benzoate plasticizer (available from Eastman Chemical Company)
BETP Plasticizer: Bis(butoxyethyl) terephthalate Multilayer (trilayer) interlayers 1 to 4 were produced using the resins and plasticizers above, in the amounts shown in Table 1 to demonstrate the effect of different resins and resins having different residual hydroxyl contents on sound insulation properties. The multilayer interlayers were then laminated with two sheets of 2.3 mm clear glass to produce multiple layer glass panels A to D of dimension 50 cm×80 cm. The interlayers were then measured for glass transition temperature and the glass panels were measured for sound insulation properties. Table 2 below shows the results. The glass panels were also measured for Sound Transmission Loss (STL) at 20° C. in accordance with ASTM E90, and the STL data obtained at 20° C. for glass panels in Table 1 (A to D) are shown in FIG. 1.

TABLE 1

| | | Skin layer | | Core layer | | | Skin layer | | |
|---|---|---|---|---|---|---|---|---|---|
| Glass Panel No. | Interlayer No. | Resin | Plasticizer 3GEH content (phr) | Resin | Plasticizer 3GEH content (phr) | Core layer thickness (mil) | Resin | Plasticizer 3GEH content (phr) | Interlayer thickness (mils) |
| A | 1 | Resin-A | 38 | Resin-B | 0 | 5 | Resin-A | 38 | 35 |
| B | 2 | Resin-A | 38 | Resin-C | 75 | 5 | Resin-A | 38 | 33 |
| C | 3 | Resin-A | 38 | Resin-D | 75 | 5 | Resin-A | 38 | 33 |
| D | 4 | Resin-A | 36 | Resin-E | 75 | 5 | Resin-A | 36 | 33 |

TABLE 2

| Glass Panel No. | Interlayer No. | Interlayer (core layer) glass transition temperature ($T_g$), ° C. | Peak Tan δ | Weighted Average TL at 2000-8000 Hz ($TL_w$) dB | TL at Coincident frequency ($TL_c$) dB |
|---|---|---|---|---|---|
| A | 1 | 2.9 | 0.53 | 38.2 | 34.3 |
| B | 2 | 2.6 | 1.11 | 40.9 | 37.7 |

TABLE 2-continued

| Glass Panel No. | Interlayer No. | Interlayer (core layer) glass transition temperature ($T_g$), °C. | Peak Tan δ | Weighted Average TL at 2000-8000 Hz ($TL_w$) dB | TL at Coincident frequency ($TL_c$) dB |
|---|---|---|---|---|---|
| C | 3 | 2.7 | 1.21 | 41.4 | 38.4 |
| D | 4 | 2.5 | 1.29 | 42.3 | 39.7 |

As shown in Table 2, Glass Panels A to D show increasing transmission loss (TL), especially in the frequency region from 2000 to 8000 Hz (e.g., the wind noise region), where Glass Panel A has the lowest TL and Glass Panel D has the highest TL. Additionally, as shown in FIG. 1, the test panels all exhibit coincident effect and the observed coincident frequency is at about 5000 Hz. The coincident effect exhibited by these panels is shown to decrease in the order of Glass Panel A to Glass Panel D. A glass panel having a higher sound insulation rating will exhibit minimal coincident effect and have higher sound transition loss in the wind noise region (the frequency region of 2000 to 8000 Hz). These panels were then rated for sound insulation performance in wind noise frequency region in the order of: Panel A<Panel B<Panel C<Panel D. Among these four panels, Panel D has the best (or highest) sound insulation performance and Panel A the worst (or lowest) performance.

The weighted average TL ($TL_w$) of the panels in wind noise frequency region for the Glass Panels A to D is shown in Table 2 above and was calculated using equation (2), previously described:

$$TL_w = 10 \times \log((\Sigma(10^{TL_i/10}))/k) \text{ where } i=1 \text{ to } k, \text{ and } k=7. \quad (2)$$

Table 2 shows the glass transition temperature ($T_g$) and peak tan delta (tan δ) of the core layers in Interlayers 1 to 4, as well as $TL_w$ and $TL_c$ of Glass Panels A to D, which contain Interlayers 1 to 4. The interlayers all have similar glass transition temperatures (of about 2.5 to 2.9° C., corresponding to the core layers), and as shown in Table 2, as the tan delta increases, the $TL_w$ and $TL_c$ also increases. Surprisingly, the panels having higher $TL_w$ and $TL_c$ values (which indicates better sound insulation) contain the interlayers having the higher peak tan delta values in the core layer. Compare, for example, Glass Panel A and Glass Panel D, where Glass Panel A contains Interlayer 1 (having a peak tan δ value of 0.53, which is the lowest tan δ of Interlayers 1 to 4) and has the lowest $TL_w$ and $TL_c$ and therefore poorer insulation to sound transmission, while Glass Panel D contains Interlayer 4 (having peak tan δ value of 1.29, the highest tan δ of interlayers 1 to 4) and has the highest $TL_w$ and $TL_c$ and better insulation to sound transmission. Glass panels containing interlayers having higher peak tan delta (tan δ) values (in the core layer) provide better sound insulation.

Monolithic interlayers and glass panels containing the monolithic interlayers were produced using the resins and plasticizers (and common additives) listed above. Table 3 shows the monolithic interlayer compositions and multiple layer glass panels containing the interlayers. Interlayers 5 to 7 were laminated with two sheets of 2.3 mm clear glass to produce multiple layer Glass Panels E to G (having overall dimensions of 50 cm×80 cm).

TABLE 3

| Glass Panel No. | Interlayer No. | Resin | Plasticizer 3GEH content (phr) | Plasticizer 3GH content (phr) | Interlayer thickness (mils) |
|---|---|---|---|---|---|
| E | 5 | Resin-F | 0 | 0 | 30 |
| F | 6 | Resin-A | 0 | 50 | 30 |
| G | 7 | Resin-G | 51 | 0 | 30 |

Figure 2:
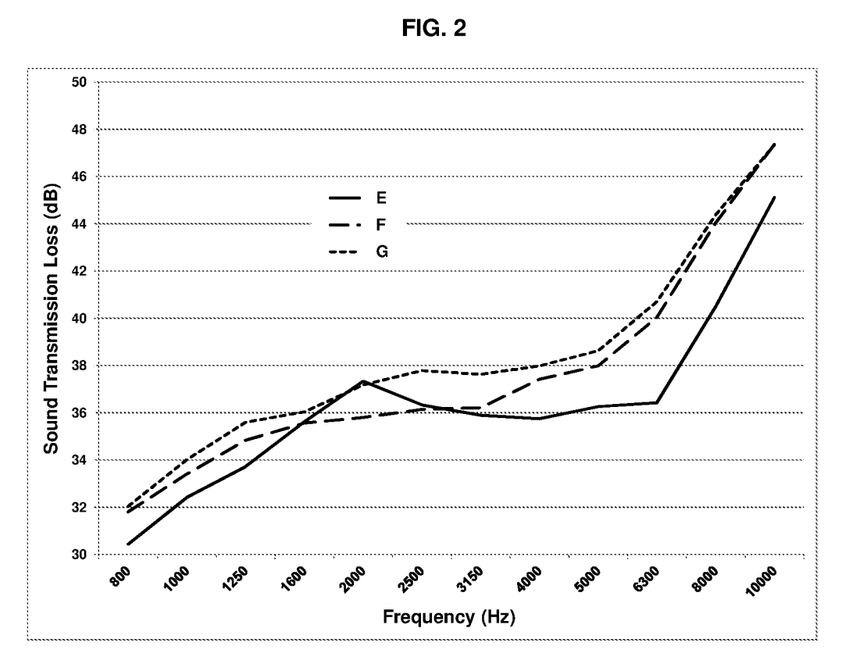
FIG. 2 is a chart showing the sound transmission loss (STL) data obtained at 20° C. for Glass Panels E to G in Table 3.

The glass panels were measured for Sound Transmission Loss (STL) in accordance with ASTM E90 at 20° C., and the STL data of Glass Panels E to G are shown in FIG. 2. Glass transition temperature ($T_g$) and peak tan delta (tan δ) of Interlayers 5 to 7 and $TL_w$ and $TL_c$ of Glass Panels E to G were measured and are summarized in Table 4 below.

TABLE 4

| Interlayer No. | Interlayer (core layer) glass transition temperature ($T_g$), °C. | Tan δ | weighted average TL at 2000-8000 Hz ($TL_w$) dB | TL at Coincident frequency ($TL_c$) dB |
|---|---|---|---|---|
| E | 18.9 | 0.67 | 37.2 | 35.7 |
| F | 19.0 | 0.95 | 39.3 | 37.4 |
| G | 19.0 | 1.27 | 40.0 | 38.0 |

As shown in Table 4, Glass panels E to G show increasing transmission loss (TL), especially in the wind noise region, in the order of Glass Panel E to Glass Panel G. As shown by FIG. 2, the glass panels tested did not exhibit distinct coincident effect for some of the panels. The calculated coincident frequency is at about 4000 Hz. The TL at the calculated coincident frequency is shown to also increase in the order of Glass Panel E to Glass Panel G.

The glass panels in Table 4 were rated for sound insulation performance in the wind noise frequency region in the order of: Panel E<Panel F<Panel G. Among these panels, Glass Panel G has the highest or best sound insulation performance and Glass Panel E has the lowest or worst performance. The interlayers all have glass transition temperatures of about 19° C., and varying tan delta values at the peak of the glass transitions.

Similar to the glass panels containing multilayer interlayers shown above in Table 2, glass panels containing monolithic interlayers show the dependence of sound insulation properties ($TL_w$ and $TL_c$) on the interlayer's tan delta (tan δ). As shown by the data in Table 4, the $TL_w$ and $TL_c$ both increase with increasing peak tan delta (tan δ) values of the interlayer. Glass Panel E contains Interlayer 5 (having peak tan δ of 0.67, which is the lowest among the three Interlayers 5, 6 and 7), and it also has the lowest $TL_w$ and $TL_c$, and therefore poorer sound insulation. Glass Panel G contains Interlayer 7 (having tan δ of 1.27, which is almost double that of Interlayer 5), the highest among these Interlayers, and has the highest $TL_w$ and $TL_c$ and therefore better sound insulation. Based on the results in Table 4, it is clear that glass panels containing monolithic interlayers exhibiting higher peak tan delta (tan δ) values provide improved or better (higher) sound insulation.

and peak tan delta (tan δ) were measured as previously described and are shown below.

TABLE 5

| Sheet No. | PVOH (wt. %) | PVAc (wt. %) | 3GEH | DOA | 4G7 | N-40 | N-60 | Benzoflex 2088 | Benzoflex 9-88 | Benzoflex 1046 | BETP | Glass Transition Temperature (Tg/° C.) | Tan δ |
|---|---|---|---|---|---|---|---|---|---|---|---|---|---|
| 1 | 10.7 | 2 | 60 | | | | | | | | | 4.6 | 1.41 |
| 2 | 11.0 | 12.0 | 75 | | | | | | | | | −2 | 1.37 |
| 3 | 8.5 | 22.8 | 60 | | | | | | | | | 1.1 | 1.80 |
| 4 | 8.5 | 22.8 | 75 | | | | | | | | | −7.0 | 1.50 |
| 5 | 10.7 | 25.8 | 60 | | | | | | | | | 1.1 | 1.60 |
| 6 | 10.7 | 25.8 | 75 | | | | | | | | | −7.1 | 1.40 |
| 7 | 10.0 | 2 | 60 | | | | | | | | | 3.4 | 1.35 |
| 8 | 9.5 | 2 | 50 | | | | | | | | | 8.7 | 1.47 |
| 9 | 10.0 | 2 | 50 | | | | | | | | | 10.3 | 1.50 |
| 10 | 10.5 | 2 | 50 | | | | | | | | | 12.3 | 1.40 |
| 11 | 10.7 | 2 | 50 | | | | | | | | | 12.4 | 1.48 |
| 12 | 10.7 | 2 | | 50 | | | | | | | | 9.0 | 1.35 |
| 13 | 10.7 | 2 | | | 50 | | | | | | | 3.5 | 1.45 |
| 14 | 10.7 | 2 | | | 60 | | | | | | | −2.8 | 1.38 |
| 15 | 10.7 | 2 | | | | 60 | | | | | | 13.7 | 1.62 |
| 16 | 10.7 | 2 | | | | 70 | | | | | | 7.4 | 1.52 |
| 17 | 10.7 | 2 | | | | | 60 | | | | | 11.3 | 1.49 |
| 18 | 10.7 | 2 | | | | | 70 | | | | | 6.8 | 1.43 |
| 19 | 10.7 | 2 | | | | | | 60 | | | | 10.5 | 1.65 |
| 20 | 10.7 | 2 | | | | | | 70 | | | | 6.4 | 1.60 |
| 21 | 10.7 | 2 | | | | | | 80 | | | | 2.5 | 1.57 |
| 22 | 10.7 | 2 | 40 | | | | | 40 | | | | −3.8 | 1.35 |
| 23 | 9.5 | 2 | | | | | | 60 | | | | 8.6 | 1.60 |
| 24 | 9.5 | 2 | | | | | | 70 | | | | 4.9 | 1.54 |
| 25 | 9.5 | 2 | | | | | | 80 | | | | 1.5 | 1.46 |
| 26 | 9.5 | 2 | | | | | | 90 | | | | −1.4 | 1.47 |
| 27 | 10.7 | 2 | | | | | | | 70 | | | 11.4 | 1.54 |
| 28 | 10.7 | 2 | | | | | | | 80 | | | 8.5 | 1.51 |
| 29 | 10.7 | 2 | | | | | | | 90 | | | 4.6 | 1.49 |
| 30 | 10.7 | 2 | | | | | | | 100 | | | 2.3 | 1.46 |
| 31 | 10.5 | 2 | | | | | | | | 70 | | 14.3 | 1.40 |
| 32 | 10.5 | 2 | | | | | | | | | 76 | 3 | 1.34 |
| 33 | 10.7 | 2 | | 50 | | | | 50 | | | | 15.9 | 1.66 |
| 34 | 10.7 | 2 | | | 50 | | | 50 | | | | 15.9 | 1.55 |
| 35 | 10.7 | 2 | | | | | | 50 | | | | 16.4 | 1.70 |
| 36 | 10.7 | 2 | | | | | | 60 | 60 | | | 16.1 | 1.59 |
| 37 | 10.5 | 2 | | | | | | | | 60 | | 18.5 | 1.50 |
| 38 | 10.7 | 2 | 40 | | | | | | | | | 18.5 | 1.56 |

The previous examples of glass panels comprising multilayer interlayers having a glass transition temperature of about 3° C. in the core layer, and monolithic interlayers having a glass transition temperature of about 19° C., clearly demonstrate that improved and superior sound insulation of a glass panel can be achieved when the interlayer has a specific peak tan delta (tan δ) value of greater than 1.29, or greater than 1.30, or greater than 1.31, or greater than 1.32, or greater than 1.33, or greater than 1.34, or even great than about 1.35. Superior sound insulation performance can be achieved regardless of the interlayer's structure and number of layers, as long as the interlayer's peak tan δ is greater than 1.29, or great than about 1.30, or greater than 1.31, or greater than about 1.32, or greater than about 1.33, or greater than about 1.34, or greater than about 1.35, and where the interlayer has a glass transition temperature less than about 20° C.

Table 5 demonstrates that interlayer sheets can be formulated with various resins having different residual hydroxyl and/or residual acetate contents and different plasticizers so that the interlayer has a peak tan delta (tan δ) of greater than 1.29, or greater than 1.30, or greater than 1.31, or greater than about 1.32, or greater than 1.33, or greater than 1.34, or greater than 1.35. The interlayers were produced as described above using the plasticizers listed above. The resins have residual hydroxyl content and residual acetate content as shown in Table 5. Glass transition temperature Table 5 shows that interlayers can be produced using different resins having different residual hydroxyl and/or residual acetate contents, and with different plasticizers, to obtain interlayers having a combination of a glass transition temperature less than 20° C. and a peak tan delta (tan δ) of at least greater than 1.29, or greater than 1.30, or greater than 1.31, or greater than 1.32, or greater than 1.33, or greater than 1.34, or greater than 1.35, or greater than 1.36, or greater than 1.37, or greater than 1.38, or greater than 1.39, or greater than 1.40 or more. These interlayers can then be used either alone or in combination with other interlayers to produce glass panels having improved sound insulation.

Interlayer sheets 1 to 6 contain resins having residual hydroxyl levels of about 8 to about 11 wt. % and residual vinyl acetate levels of about 2 to 26 wt. %, and 3GEH plasticizer in amounts of from 60 to 75 phr. Interlayer sheets 1 to 6 exhibit glass transition temperatures of from −7.1 to 4.6° C. and have peak tan delta (tan δ) values of 1.37 to 1.80 at the glass transition. Multilayer interlayers comprising interlayer sheets 1 to 6 as the core layers can be stably formulated with minimum plasticizer migration between adjacent skin and core layers by choosing skin layer resins to have residual hydroxyl content about 19 to 21 wt. % and plasticizer content about 30 to 36 phr, thus producing multilayer interlayers that have glass transition temperatures between −7.1 to 4.6° C. and peak tan delta (tan δ) values between 1.37 and 1.80.

Interlayer sheets 7 to 14 contain resins having residual hydroxyl levels of about 9.5 to about 11 wt. %, residual vinyl acetate levels of about 2 wt. %, and different conventional plasticizers at levels of from 50 to 60 phr. Interlayer sheets 7 to 14 exhibit glass transition temperatures of from −2.8 to 12.4° C. and have peak tan delta (tan δ) values of 1.35 to 1.50 at the glass transition. Multilayer interlayers comprising interlayer sheets 7 to 14 as core layers can be stably formulated with minimum plasticizer migration between adjacent skin and core layers by choosing skin layer resins to have residual hydroxyl contents of about 19 to 20 wt. % and a plasticizer that is the same plasticizer as in the core layer in amounts of about 25 to 30 phr, thus maintaining interlayers having glass transition temperatures between −2.8 and 12.4° C. and peak tan delta (tan δ) values between 1.35 and 1.50.

Interlayer sheets 15 to 32 contain resins having residual hydroxyl levels of about 9.5 to about 11 wt. %, residual vinyl acetate levels of about 2 wt. %, and comprise plasticizers containing at least one aromatic moiety, or in the case of interlayer sheet 22, a blend of a conventional plasticizer and a plasticizer containing at least one aromatic moiety, at levels of from 60 to 100 phr. Sheets 15 to 32 exhibit glass transition temperatures of from −3.8 to 14.3° C. and have peak tan delta (tan δ) values of 1.34 to 1.62 at the glass transition. Comparing to the interlayer sheets containing conventional plasticizers (Interlayer sheets 7 to 14), sheets containing plasticizers having at least one aromatic moiety exhibit higher peak tan delta (tan δ) values. Multilayer interlayers comprising interlayer sheets 15 to 32 as core layers can be stably formulated with minimum plasticizer migration between adjacent skin and core layers by choosing skin layer resins to have residual hydroxyl contents of about 19 to 23 wt. % and a plasticizer that is the same plasticizer as in the core layer in amounts of about 30 to 50 phr, thus maintaining interlayers having glass transition temperatures between −3.8 and 14.3° C. and peak tan delta (tan δ) values between 1.34 and 1.62. All of interlayer sheets 7 to 32 have glass transition temperatures of less than 20° C. and peak tan delta values of at least 1.33.

Interlayer sheets 33 to 38 contain resins having residual hydroxyl contents of about 11 wt. % (10.5 to 10.7 wt. %), residual vinyl acetate contents of about 2 wt. %, and various conventional plasticizers and plasticizers having at least one aromatic moiety in amounts of from 40 to 60 phr. Interlayer sheets 33 to 38 have glass transition temperatures from about 16 to 19° C. and peak tan delta (tan δ) values of 1.50 to 1.70 and can be used as monolithic interlayer, or as the core layer in multilayer interlayer compositions. Again, all of the interlayer sheets 33 to 38 have glass transition temperatures of less than 20° C. and peak tan delta values of at least 1.33, or in this case, at least 1.50.

One example of an exemplary multilayer interlayer containing a core layer from Table 5 (Interlayer Sheet 32) is compared to a multilayer interlayer containing a core layer in Interlayer 2 from Table 1, is shown in Table 6. Glass Panel B is described in Table 2. Glass Panel H comprises Interlayer 8 comprising Interlayer Sheet 32 (Table 5) as a core layer, and skin layers comprising the same resin as the skin layers of Interlayer 2. The interlayer 2 in Glass Panel B comprises a conventional plasticizer (3GEH), while the interlayer 8 in Glass Panel H comprises BETP, a plasticizer having at least one aromatic moiety.

Table 7 summarizes the glass transition temperature ($T_g$) and peak tan delta (tan δ) of the core layers in Interlayers 2 and 8, as well as $TL_w$ and $TL_c$ of the glass panels B and H containing Interlayers 2 and 8.

TABLE 6

| | | Skin layer | | | Core layer | | | | Skin layer | | |
|---|---|---|---|---|---|---|---|---|---|---|---|
| Glass panel No. | Interlayer No. | Resin | Plasticizer 3GEH content (phr) | Plasticizer BETP content (phr) | Resin | Plasticizer 3GEH content (phr) | Plasticizer BETP content (phr) | Core layer thickness (mil) | Resin | Plasticizer 3GEH content (phr) | Plasticizer BETP content (phr) | Interlayer thickness (mils) |
| B | 2 | Resin-A | 38 | | Resin-C | 75 | | 5 | Resin-A | 38 | | 33 |
| H | 8 | Resin-A | | 41 | Resin-C | | 76 | 5 | Resin-A | | 41 | 33 |

TABLE 7

| Glass panel No. | Interlayer No. | Interlayer (core layer) glass transition temperature ($T_g$), ° C. | Peak Tan δ | weighted average TL at 2000-8000 Hz ($TL_w$) dB | TL at Coincident frequency ($TL_c$) dB |
|---|---|---|---|---|---|
| B | 2 | 2.6 | 1.11 | 40.9 | 37.7 |
| H | 8 | 3 | 1.34 | 42.6 | 38.5 |

The comparative interlayer (Interlayer 2) and disclosed interlayer (Interlayer 8) contain the same resins for skin and core but different plasticizers. The plasticizer does not migrate between the skin and core layers, but instead the multilayer interlayer is stably formulated to maintain the plasticizer differences between skin and core layers.

Table 7 shows that Glass Panel H, which contains Interlayer 8 (having a glass transition temperature of about 3° C. and a peak tan delta (tan δ) of 1.34), has better sound insulation than Glass Panel B.

Selecting the resin properties, and more specifically, the residual hydroxyl and/or residual acetate contents, as well as the plasticizer, provides the ability to produce an interlayer having a higher peak tan delta (tan δ) as well as a glass transition temperature below a certain level (such as below 20° C.). By selecting the resin and plasticizer to increase the peak tan delta of an interlayer, it is possible to increase the transmission loss of a glass panel that includes the interlayer, and the interlayer produced has better sound insulating properties when included in a glass panel.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed:

1. A polymer interlayer comprising:
a first layer comprising a first poly(vinyl acetal) resin having a first residual hydroxyl content and a first residual acetate content, and a first plasticizer; and
a second layer comprising a second poly(vinyl acetal) resin having a second residual hydroxyl content and a second residual acetate content, and a second plasticizer;
a third layer comprising a third poly(vinyl acetal) resin having a third residual hydroxyl content and a third residual acetate content, and a third plasticizer;
wherein the residual hydroxyl contents, the residual acetate contents and the plasticizers are selected such that the polymer interlayer has at least one glass transition temperature less than about 20° C. and a peak tan delta of greater than 1.29,
and a glass panel having a configuration of 2.3-mm glass//interlayer//2.3-mm glass and at 20° C. has a transmission loss, TLw, of greater than 41 decibels as measured by weighted average sound transmission loss at 2000 to 8000 Hz, and a transmission loss, TLc, of greater than 38 decibels at the coincident frequency.

2. The polymer interlayer of claim 1, wherein at least one of the difference between the first residual hydroxyl content and the second residual hydroxyl content, the third residual hydroxyl content and the second residual hydroxyl content, the first residual acetate content and the second residual acetate content and the third residual acetate content and the second residual acetate content is at least 2.0 weight percent.

3. The polymer interlayer of claim 1, wherein the peak tan delta is greater than 1.30.

4. The polymer interlayer of claim 1, wherein the peak tan delta is greater than 1.32.

5. The polymer interlayer of claim 1, wherein the peak tan delta is greater than 1.35.

6. The polymer interlayer of claim 1, wherein the peak tan delta is greater than 1.40.

7. The polymer interlayer of claim 1, wherein the sound transmission loss, TLw, is greater than 41.5 decibels.

8. The polymer interlayer of claim 1, wherein the transmission loss, TLw, is greater than 42 decibels.

9. The polymer interlayer of claim 1, wherein the sound transmission loss, TLw, is greater than 42.5 decibels.

10. The polymer interlayer of claim 1, wherein the sound transmission loss, TLw, is greater than 43 decibels.

11. The polymer interlayer of claim 1, wherein the sound transmission loss, TLc, is greater than 39 decibels.

12. A multilayer glass panel comprising:
a first glass substrate,
a second glass substrate, and
the polymer interlayer of claim 1, wherein the polymer interlayer is between the first and second glass substrates.

13. A polymer interlayer comprising:
a first layer comprising a first poly(vinyl acetal) resin having a first residual hydroxyl content and a first residual acetate content, and a first plasticizer; and
a second layer comprising a second poly(vinyl acetal) resin having a second residual hydroxyl content and a second residual acetate content, and a second plasticizer;
a third layer comprising a third poly(vinyl acetal) resin having a third residual hydroxyl content and a third residual acetate content, and a third plasticizer;
wherein the residual hydroxyl contents, the residual acetate contents and the plasticizers are selected such that the polymer interlayer has at least one glass transition temperature less than about 20° C. and a peak tan delta of greater than 1.29; and
wherein at least one of the difference between the first residual hydroxyl content and the second residual hydroxyl content, the third residual hydroxyl content and the second residual hydroxyl content, the first residual acetate content and the second residual acetate content and the third residual acetate content and the second residual acetate content is at least 2.0 weight percent,
and a glass panel having a configuration of 2.3-mm glass//interlayer//2.3-mm glass and at 20° C. has a transmission loss, TLw, of greater than 42 decibels as measured by weighted average sound transmission loss at 2000 to 8000 Hz, and a transmission loss, TLc, of greater than 41 decibels at the coincident frequency.

14. The polymer interlayer of claim 13, wherein the peak tan delta is greater than 1.32.

15. The polymer interlayer of claim 13, wherein the peak tan delta is greater than 1.35.

16. The polymer interlayer of claim 13, wherein the peak tan delta is greater than 1.40.

17. The polymer interlayer of claim 13, wherein the sound transmission loss, TLw, is greater than 41.5 decibels.

18. The polymer interlayer of claim 13, wherein the transmission loss, TLw, is greater than 42 decibels.

19. The polymer interlayer of claim 13, wherein the sound transmission loss, TLw, is greater than 43 decibels.

20. The polymer interlayer of claim 13, wherein the sound transmission loss, TLc, is greater than 39 decibels.

* * * * *